United States Patent
Tanizawa et al.

(10) Patent No.: US 6,595,065 B2
(45) Date of Patent: *Jul. 22, 2003

(54) PRESSURE DETECTING APPARATUS WITH METALLIC DIAPHRAGM

(75) Inventors: Yukihiko Tanizawa, Kariya (JP); Kazuaki Hamamoto, Nagoya (JP); Inao Toyoda, Okazaki (JP); Hiroaki Tanaka, Kariya (JP); Yasutoshi Suzuki, Okazaki (JP)

(73) Assignee: Denso Corporation, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/492,605

(22) Filed: Jan. 27, 2000

(65) Prior Publication Data

US 2001/0039837 A1 Nov. 15, 2001

(51) Int. Cl.⁷ .................................................. G01L 9/04
(52) U.S. Cl. ........................................................ 73/720
(58) Field of Search .......................... 73/715, 754, 721, 73/727, 756, 716, 720, 726, 862.043, 862.044, 762.045

(56) References Cited

U.S. PATENT DOCUMENTS

| | | | |
|---|---|---|---|
| 4,140,023 A | * 2/1979 | Edwards et al. | 73/721 |
| 4,439,752 A | 3/1984 | Starr | |
| 4,445,385 A | * 5/1984 | Endo | 338/4 |
| 4,683,755 A | * 8/1987 | Samek | 73/727 |
| 4,712,082 A | 12/1987 | Ito et al. | |
| 4,739,381 A | * 4/1988 | Miura et al. | 357/26 |
| 4,840,067 A | * 6/1989 | Nishida et al. | 73/726 |
| 5,289,721 A | 3/1994 | Tanizawa et al. | |
| 5,436,491 A | * 7/1995 | Hase et al. | 257/417 |
| 5,581,226 A | 12/1996 | Shah | |
| 5,867,886 A | * 2/1999 | Ratell et al. | 29/595 |
| 5,872,315 A | 2/1999 | Nagase et al. | |

FOREIGN PATENT DOCUMENTS

| | | |
|---|---|---|
| DE | 4130044 | 3/1992 |
| JP | B2-60-13314 | 2/1980 |
| JP | A63-196081 | 8/1988 |
| JP | 03028732 | 2/1991 |
| JP | A4-267566 | 9/1992 |
| JP | 05034226 | 2/1993 |
| SU | 1615579 | 12/1990 |

* cited by examiner

Primary Examiner—Max Noori
(74) Attorney, Agent, or Firm—Posz & Bethards, PLC

(57) ABSTRACT

A pressure detecting apparatus has a single-crystal semiconductor sensor chip disposed on a metallic diaphragm through a low melting point glass. The sensor chip has a planar shape selected from a circular shape, a first polygonal shape having more than five sides and having interior angles all less than 180°, and a second polygonal shape having a ratio of a circumscribed circle diameter relative to an inscribed circle diameter being less than 1.2. Four strain gauge resistors are disposed on X, Y axes passing through a center point O of the sensor chip in parallel with <110> directions. Accordingly, thermal stress is reduced not to adversely affect a detection error and simultaneously high sensitivity is provided.

40 Claims, 30 Drawing Sheets

(LOW MELTING POINT GLASS : OCTAGON)

(LOW MELTING POINT GLASS : OCTAGON)

(LOW MELTING POINT GLASS: CIRCULAR SHAPE)

(LOW MELTING POINT GLASS: CIRCULAR SHAPE)

(LOW MELTING POINT GLASS: HEXAGON)

(LOW MELTING POINT GLASS : HEXAGON)

(ROTATION ANGLE θ = 0°)

(ROTATION ANGLE θ=22.5°)

(ROTATION ANGLE θ = 37°)

(ROTATION ANGLE θ = 40°)

FIG. 37 (ROTATION ANGLE θ = 30°)

PRESSURE DETECTING APPARATUS WITH METALLIC DIAPHRAGM

CROSS REFERENCE TO RELATED APPLICATIONS

This application is based upon and claims the benefit of Japanese Patent Applications No. 9-199972 filed on Jul. 25, 1997, and No. 10-157915 filed on Jun. 5, 1998, the contents of which are incorporated herein by reference.

BACKGROUND OF THE INVENTION

1. Field of the Invention

This invention relates to a pressure detecting apparatus suitable for detecting a high pressure of fluid, particularly to a pressure detecting apparatus utilizing a piezo resistance effect of single-crystal semiconductor.

2. Description of the Related Art

JP-B2-7-11461 discloses such a pressure detecting apparatus, which has a metallic diaphragm integrally formed with a sensing body and a square sensor chip (semiconductor chip) holding strain gauge resistors thereon and bonded to the diaphragm through a glass layer. In the pressure detecting apparatus, thermal stress is produced due to a difference in linear thermal expansion coefficient between the semiconductor chip and the metallic diaphragm, and it is applied to the sensor chip to cause a detection error. To reduce such a detection error, conventionally, the following countermeasures are proposed. That is, the metallic diaphragm is made of material having a linear thermal expansion coefficient close to that of the sensor chip, and the metallic diaphragm and the sensor chip are thinned to improve sensitivity, i.e., to relatively reduce the detection error caused by the thermal stress. However, it is difficult to sufficiently reduce the detection error only by the above countermeasures.

SUMMARY OF THE INVENTION

It is an object of the present invention to provide a pressure detecting apparatus including a semiconductor sensor chip bonded to a metallic diaphragm and capable of precisely detecting a high pressure with simple structure. Another object of the present invention is to provide a pressure detecting apparatus capable of minimizing an adverse effect to a detection error by a thermal stress that is produced due to a difference in linear thermal expansion coefficient between a metallic diaphragm and a sensor chip.

Briefly, according to the present invention, a single-crystal semiconductor sensor chip disposed on a metallic diaphragm has a planar shape selected from a group consisting of a circular shape, a first polygonal shape having more than five sides and having interior angles all less than 180°, and a second polygonal shape having a ratio of a circumscribed circle diameter relative to an inscribed circle diameter being less than 1.2.

In this state, when the sensor chip is made of a single-crystal semiconductor having an approximately (100) crystal orientation, a strain gauge resistors can be disposed point-symmetrically with respect to a center point of the sensor chip on first and second axes passing through the center point in parallel with <110> directions of the single-crystal semiconductor. When the sensor chip is made of a single-crystal semiconductor having an approximately (110) crystal orientation, one of the plurality of strain gauge resistors is disposed at a central portion of the sensor chip, while another of the plurality of strain gauge resistors is disposed at a peripheral portion of the sensor chip. Accordingly, an adverse effect of a thermal stress caused by a difference in linear thermal expansion coefficient can be reduced with simple structure, resulting in decrease in a detection error. At the same time, a rate of change in resistance of the strain gauge resistor increases, resulting in high sensitivity.

Instead of the sensor chip, a bonding member interposed between the sensor chip and the diaphragm may have a planar shape selected from a group consisting of a circular shape, a first polygonal shape having more than five sides and having interior angles all less than 180°, and a second polygonal shape having a ratio of a circumscribed circle diameter relative to an inscribed circle diameter being less than 1.2. Accordingly, the same effects as described above can be provided.

When the sensor chip made of a single-crystal semiconductor has a rectangular shape with first and second sides, instead of controlling the shape of the bonding member, one of the first and second sides is set to form a specific angle in a range of 15° to 37° with one of crystal directions perpendicular to one another and parallel to a surface plane of the sensor chip. More preferably, the specific angle of the one of the first and second sides of the sensor chip and the one of the crystal directions is 15° to 33°. A plurality of strain gauge resistors can be disposed on first and second axes passing through the center point in parallel with the crystal directions perpendicular to one another. Accordingly, the same effect as described above can be provided.

When the single-crystal semiconductor forming the rectangular sensor chip has an approximately (100) plane orientation, the crystal directions correspond to <110> directions of the single-crystal semiconductor. In this case, specific angle φ between one of the sides of the sensor chip and one of the <110> directions is expressed by the following equation:

$$\phi = A - Be^{c(T+t)}$$

where T represents a thickness of the diaphragm, t represents a thickness of the bonding member, and A, B, C represent predetermined constants, respectively.

Preferably, T is a range of 100 μm to 3500 μm, t is in a range of 15 μm to 150 μm, A is in a range of 40 to 45, B is in a range of 20 to 30, and C is in a range of $-4 \times 10^{-4}$ to $-2 \times 10^{-4}$. Accordingly, the pressure detecting apparatus of the present invention can be readily designed to reduce the detection error and to provide high sensitivity.

DETAILED DESCRIPTION OF THE PREFERRED EMBODIMENTS

Other objects, features and advantageous of the present invention will be made more apparent by the following detailed descriptions with reference to the accompanying drawings. In the drawings.

DESCRIPTION OF PREFERRED EMBODIMENTS (First Embodiment)

Figure 1:
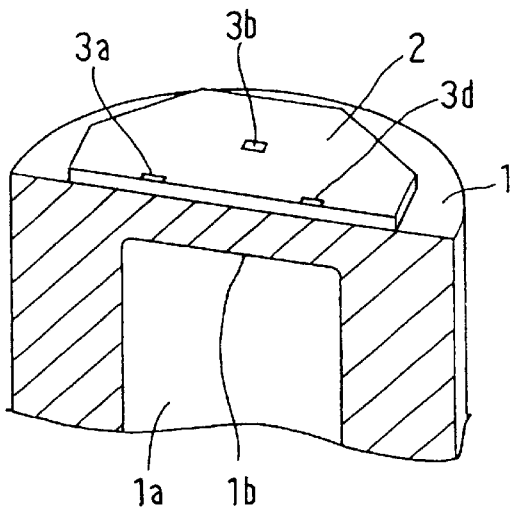
FIG. 1 is a perspective view partially showing a pressure detecting apparatus in a first preferred embodiment.
Figure 2:
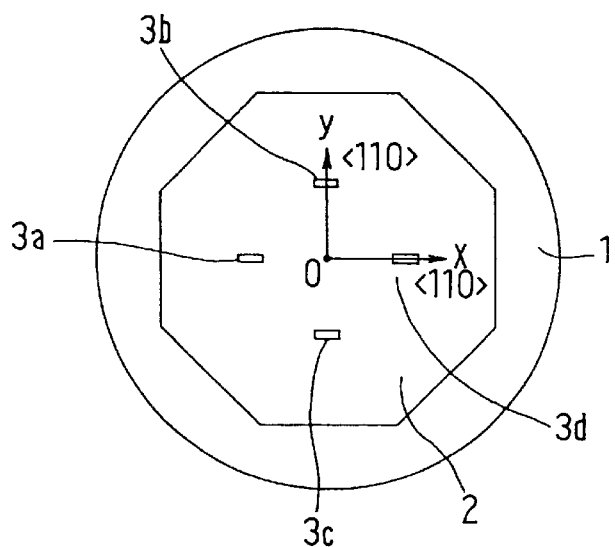
FIG. 2 is a plan view showing a sensor chip of the pressure detecting apparatus of FIG. 1.

A first preferred embodiment of the present invention will be explained below with reference to FIGS. 1–7. In FIGS. 1, 2, a metallic sensing body 1 is formed into a bottomed cylindrical shape having a pressure receiving port 1a at a lower end thereof and a metallic diaphragm 1b for receiving a pressure at an upper end, i.e., at the bottom portion thereof. The diaphragm 1b has a thickness corresponding to the pressure to be detected.

A plate-like sensor chip 2 made of single-crystal silicon (single-crystal semiconductor) having approximately (100) plane orientation is bonded to the upper surface of the diaphragm 1b by utilizing low melting point glass, adhesive or the like (not shown) serving as a bonding member. It is noted that the single-crystal silicon having approximately (100) plane orientation includes single-crystal silicon having a surface plane inclined by several degrees from the (100) plane at most. The sensor chip 2 is bonded to the diaphragm 1b at the entire back surface thereof.

Figure 3:
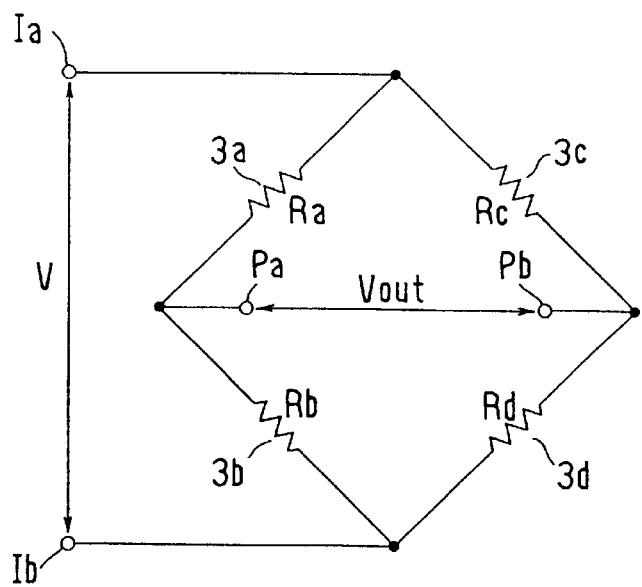
FIG. 3 is a circuit diagram showing a connecting state of strain gauge resistors of the pressure detecting apparatus.

The sensor chip 2 is formed into a regular octagon as a plane shape, and the thickness and the dimension between opposite sides of the regular octagon are for example approximately 0.2 mm and 3.5 mm. Four strain gauge resistors 3a, 3b, 3c, 3d are formed on the surface of the sensor chip 2 by a well-known diffusion process and are connected to one another so as to form a Wheatstone bridge circuit for taking out a signal as shown in FIG. 3. Each of the strain gauge resistors 3a–3d is illustrated with a rectangular shape from which a change in resistance value in a longitudinal direction is taken out as a sensor output; however, the shape of each of the strain gauges 3a–3d is not limited to such a rectangular shape.

As shown in FIG. 2, the single-crystal silicon forming the sensor chip 2 has two <110> directions perpendicular to one another and parallel to the surface plane of the sensor chip 2. Incidentally, the angular brackets < > are used to denote crystallographically equivalent directions (crystal directions) such as [110], [011], [101], in which the brackets [ ] are used to denote a specific direction. The parentheses ( ) are used to denote a specific plane.

In the present embodiment, axes parallel to the <110> directions passing through the center point O of the sensor chip 2 are herebelow respectively referred to as x, y axes. The strain gauge resistors 3a–3d are disposed on the x, y axes such that positions where the resistors 3a–3d are disposed are point-symmetrical with respect to the center point O of the sensor chip 1. Specifically, the strain gauge resistors 3a, 3d are disposed on the x axis to be parallel to the x axis and to be separated equidistantly from the center point O. The strain gauge resistors 3b, 3c are disposed on the y axis to be perpendicular to the y axis and to be separated equidistantly from the center point O. Each of the x, y axes (<110> directions) crosses the corresponding two sides of the sensor chip 2 approximately at right angles.

It is desirable for the sensing body 1 to be made of metal whose thermal expansion coefficient provides a difference from that of the single-crystal silicon as the sensor chip 2 as small as possible. For example, covar (30% Ni-20%Co—Fe) may be used for the sensing body 1. The diameter of the pressure receiving port 1a is approximately 2.5 mm and the thickness of the diaphragm 1b is approximately 0.65 mm. Accordingly, the pressure in a range of approximately 10 MPa to 20 MPa can be detected.

In the structure described above, the pressure to be detected is applied to the surface of the diaphragm 1b on the pressure receiving port side, while a constant reference pressure (e.g. atmospheric pressure) is applied to the other surface of the diaphragm 1b on the opposite side of the pressure receiving port 1a. Accordingly, the diaphragm 1b and the sensor chip 2 deflect together due to a difference between the applied pressures. The deflection of the sensor chip 2 is accompanied by strain deformation of the surface region thereof, which causes changes in value of resistance of the strain gauge resistors 3a–3d. Accordingly, in a state where a constant DC voltage V is applied between input terminals Ia and Ib of the Wheatstone bridge circuit shown in FIG. 3, a signal having an output voltage level $V_{out}$ corresponding to the pressure to be detected is output from output terminals Pa and Pb.

Next, a relationship between the output voltage level $V_{out}$ described above and the positions of the strain gauge resistors 3a–3d, and thermal stress characteristics generated due to a difference in linear thermal expansion coefficients between the sensing body 1 and the sensor chip 2 will be described below. First, the relationship between the output voltage level $V_{out}$ and the positions of the strain gauge resistors 3a–3d will be considered.

Figure 4:
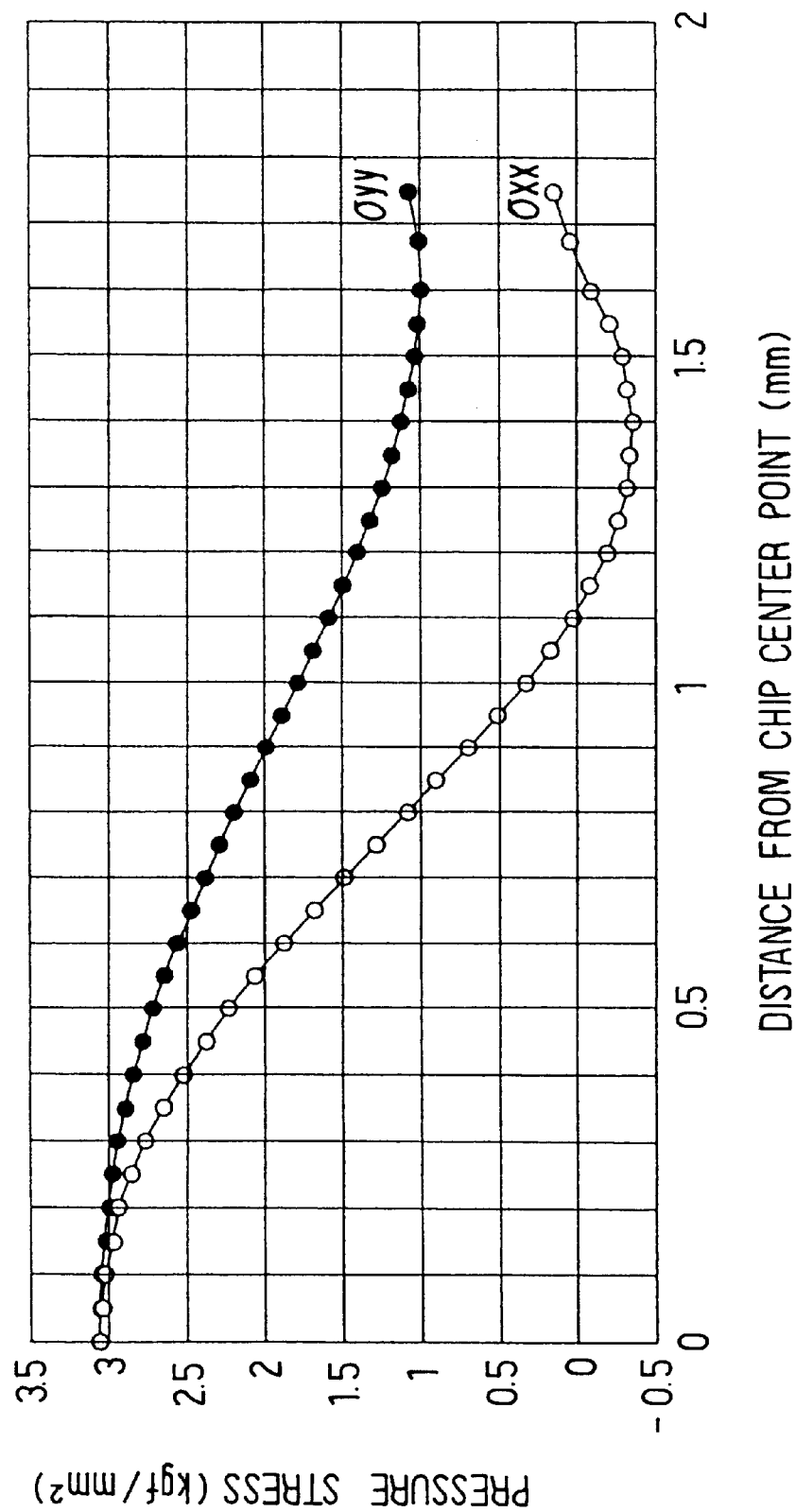
FIG. 4 is a graph showing stress distribution produced on a surface of the sensor chip in accordance with an applied pressure in the first embodiment.

FIG. 4 shows a result of stress distribution produced on the surface of the sensor chip 2 by applying the pressure, which was analyzed by means of the finite element method (FEM). In concrete, stresses were analyzed at a plurality of points having different distances from the center point O one another along the x-axis (<110> direction) in FIG. 2, and are shown in FIG. 4 in a decomposed state that each of the stresses is decomposed into a stress σxx as an x axis direction component and a stress σyy as a y axis direction component.

The piezo resistance effect on the (100) plane of the single-crystal silicon is influenced by the both stresses σxx and σyy and a rate of change in value of resistance ΔR/R of each of the strain gauge resistors 3a, 3d disposed on the x axis is expressed by the following equation (1):

$$\Delta R/R = (\pi 44/2)(\sigma xx - \sigma yy) \tag{1}$$

wherein R is an initial value of resistance of each gauge, ΔR is an incremental value of resistance, π44 is a piezo resistance coefficient and σxx and σyy represent average stresses, respectively.

A rate of change in value of resistance ΔR'/R of each of the strain gauge resistors 3b, 3c disposed on the y axis is expressed by the following equation (2) from a view of symmetrical property around a crystallographic axis:

$$\Delta R'/R = (\pi 44/2)(\sigma xx' - \sigma yy') \tag{2}$$

wherein ΔR' is an incremental value of resistance of each gauge and σxx' and σyy' represent an average stress in the x axis direction and an average stress in the y axis direction, respectively, at the points along the y axis (<110> direction) in FIG. 2.

Further, because the respective strain gauge resistors 3a–3d are disposed point-symmetrically with respect to the center point O of the sensor chip 2, the relationships of the following equations (3) exist:

$$\sigma xx = \sigma yy', \quad \sigma yy = \sigma xx' \tag{3}$$

Here, when the pressure to be detected is applied to the diaphragm from the lower face, the values of resistance of the strain gauge resistors 3a, 3d decrease and the values of resistance of the strain gauge resistors 3b, 3c increase. In this state, because the equations (3) holds due to the symmetrical arrangement of the strain gauge resistors 3a–3d, the incremental rates of resistance of the strain gauge resistors 3b, 3c, obtained from the equation (2) become equal to the decremental rates of resistance of the strain gauge resistors 3a, 3d, obtained from the equation (1).

When the Wheatstone bridge circuit is formed by the strain gauge resistors 3a–3d as shown in FIG. 3, the output voltage level $V_{out}$ taken out from the output terminals Pa and Pb is determined by the following equation (4):

$$V_{out} = [(RbRc - RaRd)/\{(Ra+Rb)(Rc+Rd)\}] \cdot V \tag{4}$$

Wherein Ra, Rb, Rc, Rd are values of resistance of the strain gauge resistors 3a–3d and have the following relationships:

$$Ra = Rd = R + \Delta R$$

$$Rb = Rc = R + \Delta R'$$

In the equation (4), the relationships among R, ΔR, ΔR' are R>>ΔR and R>>ΔR'. Based on these relationships and the equations (1)–(3), the equation (4) can be transformed into the following equation (5):

$$V_{out} = (\pi 44/2)(\sigma yy - \sigma xx)V \tag{5}$$

It can be seen from the equation (5) that the output voltage level $V_{out}$ representing the pressure to be detected is proportional to the difference between the stresses in the x axis direction and in the y axis direction acting on the respective strain gauge resistors 3a–3d. That is, as understood from FIG. 4 and from the equation (5), the output voltage level $V_{out}$ is increased to improve the sensitivity by forming the strain gauge resistors 3a–3d at positions apart from the center point O as far as possible.

Next, the thermal stress produced due to a difference in linear thermal expansion coefficients between the sensing body 1 and the sensor chip 2 will be described. The thermal stress can cause a detection error. Therefore, it is desirable that the thermal stress is decreased as small as possible.

Figure 5:
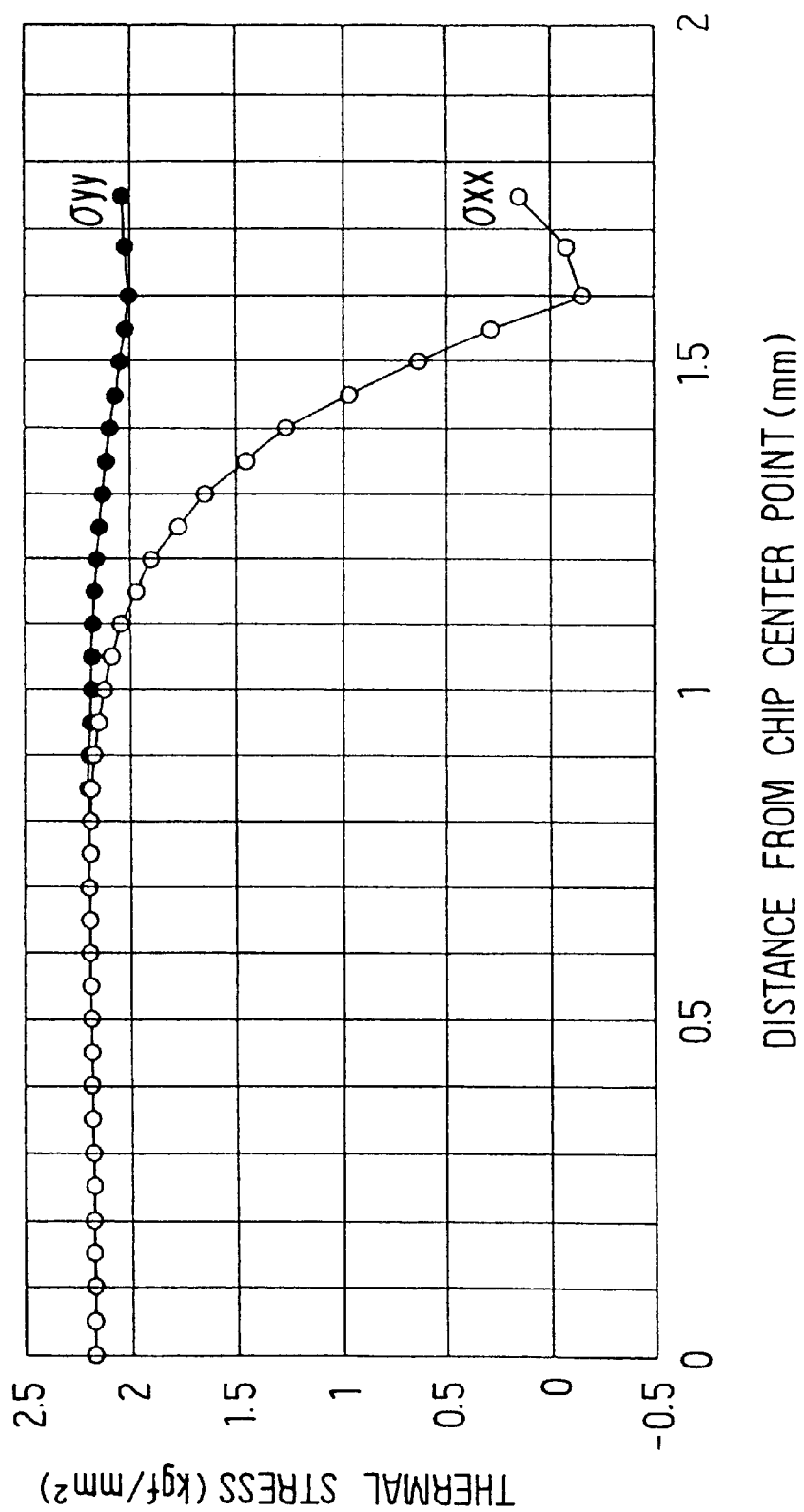
FIG. 5 is graph showing thermal stress distribution produced on the surface of the sensor chip in the first embodiment.

FIG. 5 shows thermal stress distribution on the surface of the sensor chip 2 in a state where a predetermined temperature difference (e.g. 95° C.) is given to the pressure detecting apparatus and no pressure was applied to the diaphragm 1b.

Figure 6:
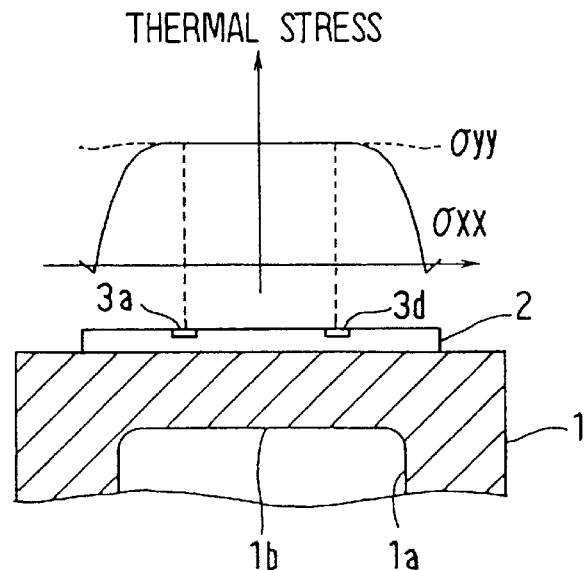
FIG. 6 is a schematic view showing the thermal stress distribution of FIG. 5 in connection with the sensor chip.

The thermal stress distribution was analyzed by the FEM. In FIG. 5, the thermal stresses, which were analyzed at a plurality of points defining different distances from the center point O of the sensor chip 2 one another, along the x axis (<110> direction) in FIG. 2, are indicated with decomposed stresses σxx in the x axis direction and decomposed stresses σyy in the y axis direction at respective points. FIG. 6 schematically shows the above analytical result in connection with the sensor chip 2.

It can be seen from FIGS. 5, 6 that when the strain gauge resistors 3a–3d are disposed at the positions where the distances from the center point O are approximately 1 mm or less, and more preferably approximately 0.8 mm or less, the difference between the thermal stresses in the x axis and y axis directions where the strain gauge resistors 3a–3d are disposed is almost zero, resulting in a significant decrease of the detection error.

Figure 7:
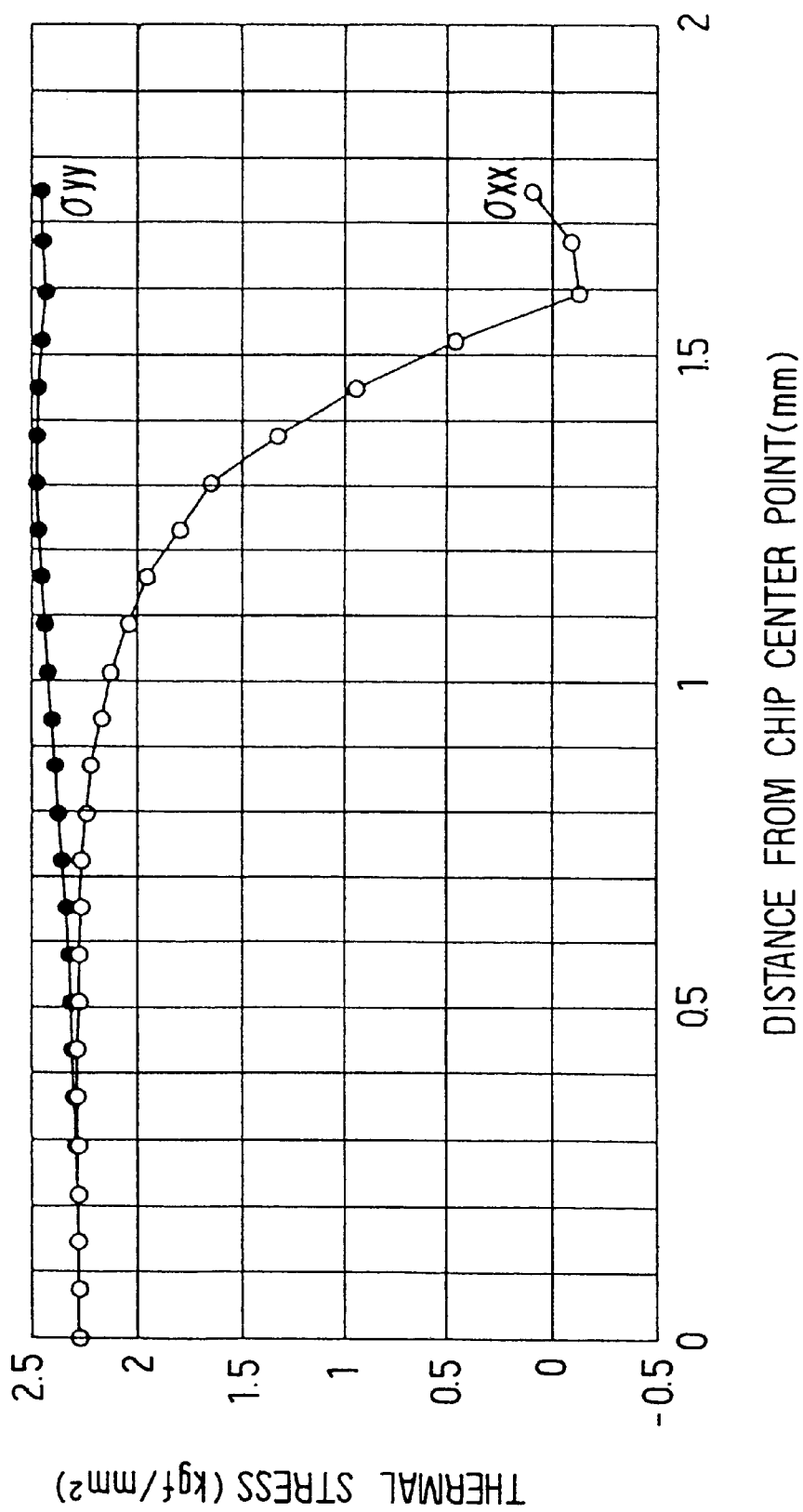
FIG. 7 is a graph showing thermal stress distribution produced on a surface of a square sensor chip.

Next, instead of the regular octagonal sensor chip 2, a square sensor chip holding the same strain gauge resistors and made of the same single-crystal silicon as those of the sensor chip 2 is bonded to the diaphragm 1b, as a model, and thermal stress distribution on the surface of the square sensor chip was analyzed in the same manner as described above. The result is shown in FIG. 7. It can be seen from FIG. 7 that the thermal stress cannot be almost zero unless the strain gauge resistors are disposed at positions where the distances from the center point O of the chip are approximately 0.5 mm or less, and more preferably approximately 0.25 mm or less. That is, the thermal stress cannot be almost zero unless the strain gauge resistors are disposed at positions relatively close to the center point O of the chip compared to the case of the octagonal sensor chip 2.

In the model using the square sensor chip, however, when the strain gauge resistors 3a–3d are disposed at the positions close to the center point O, there arises a problem that when the pressure to be detected is applied, the difference between the stresses in the x axis direction and in the y axis direction acting on each of the strain gauge resistors 3a–3d becomes small, so that the detected output voltage becomes small. Because of this, when the square sensor chip is used, to improve the sensitivity, the detection error increases by a certain degree. On the other hand, to decrease the detection error, the sensitivity decreases.

In contrast, when the sensor chip 2 having the regular octagonal shape is used as in the present embodiment, as shown in FIG. 4, when the strain gauge resistors 3a–3d are disposed at the positions where the difference between the thermal stresses in the x axis and y axis directions is almost zero, specifically at the positions where the distances from the center point O are approximately 0.8 mm or less, the difference between the stresses σxx and σyy in the x axis and y axis directions acting on each of the strain gauge resistors 3a–3d is large. As a result, the output voltage level $V_{out}$ can be increased. That is, according to the present embodiment, the sensitivity can be improved while reducing the detection error considerably by the effect of the shape of the sensor chip 2 being regular octagon as a plane shape.

Further, in the case where the sensor chip 2 is made of the single-crystal silicon having approximately (100) plane orientation as in the present embodiment, the strain gauge resistors 3a–3d composing the Wheatstone bridge circuit are disposed point-symmetrically with respect to the center point O of the sensor chip 2. In such an arrangement, as described above, when the pressure is applied to the diaphragm 1b, the incremental values of resistance of the strain gauge resistors 3b, 3c become equal to the decremental values of resistance of the strain gauge resistors 3a, 3d. As a result, linearity of the output voltage with respect to the pressure to be detected becomes sufficient.

Also, when the plane shape of the sensor chip 2 is a regular octagon, the layout of the sensor chip 2 on a semiconductor wafer is simplified and waste space is reduced. Therefore, a process for cutting out the sensor chips from the semiconductor wafer is simplified and yield of the sensor chips is improved.

(Second Embodiment)

Figure 8:
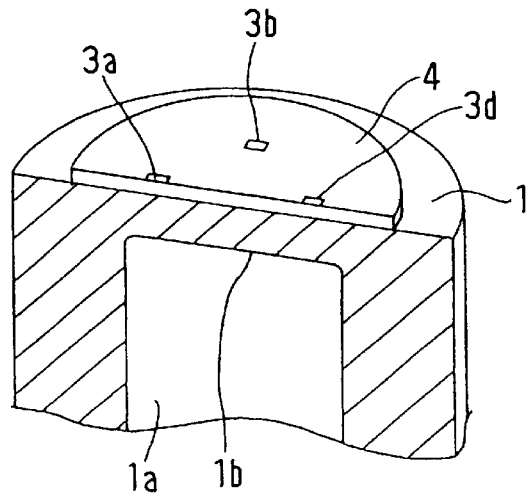
FIG. 8 is a perspective view partially showing a pressure detecting apparatus in a second preferred embodiment.
Figure 9:
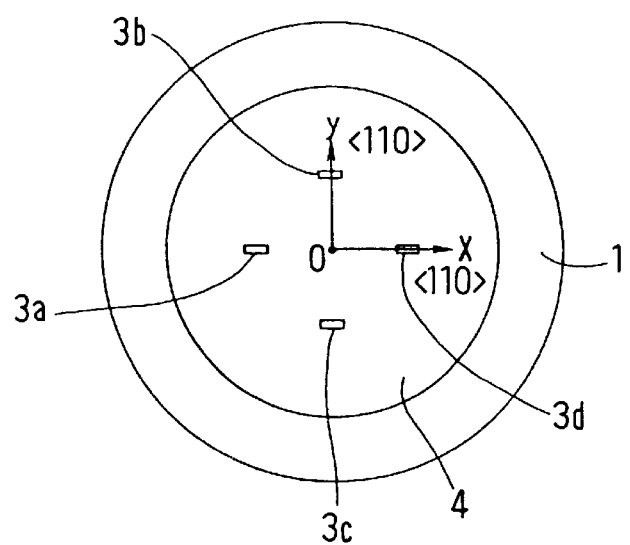
FIG. 9 is a plan view showing a sensor chip of the pressure detecting apparatus of FIG. 8.
Figure 10:
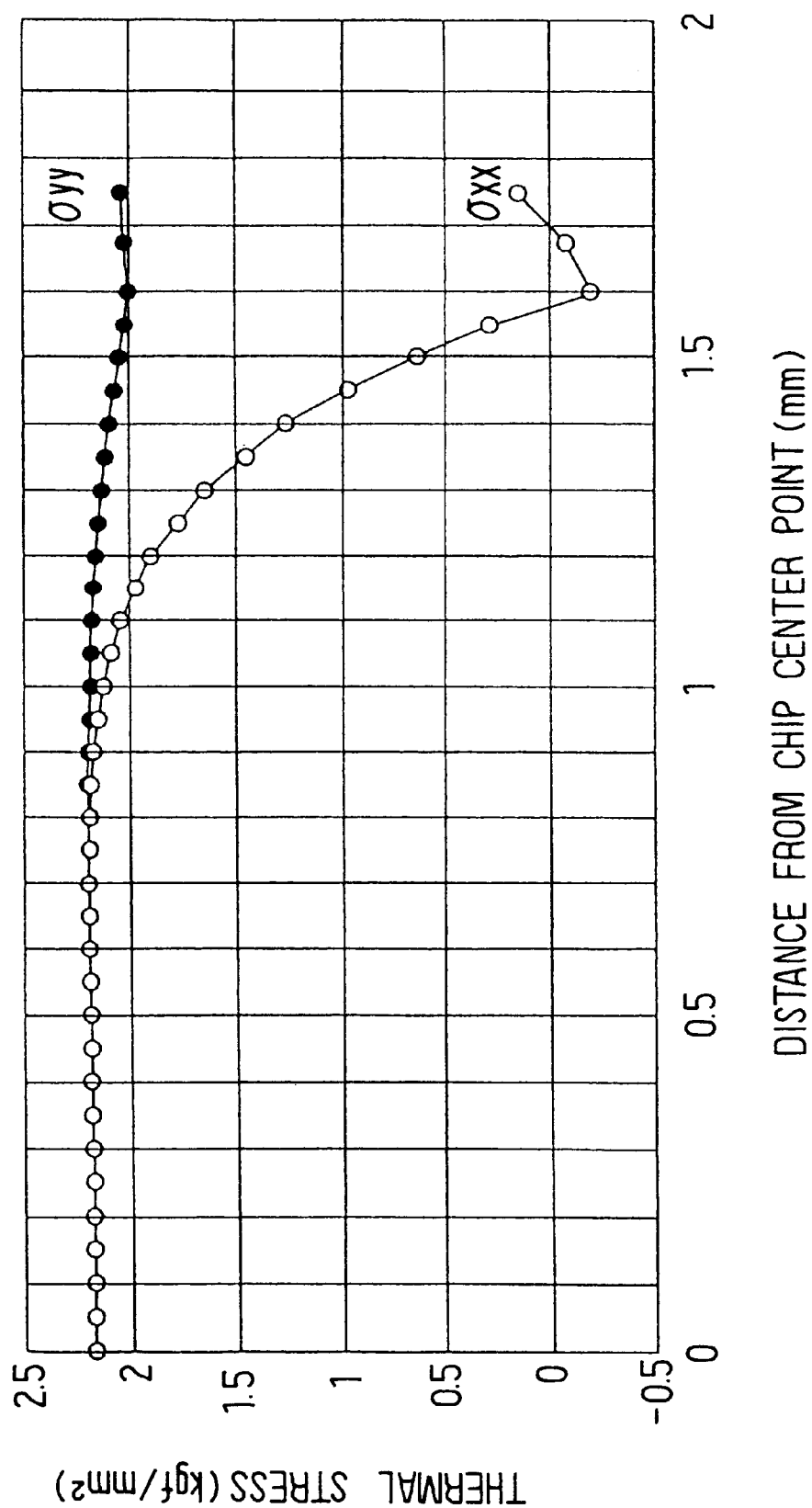
FIG. 10 is a graph showing thermal stress distribution produced on the surface of the sensor chip of FIG. 9.

FIGS. 8–10 show a second preferred embodiment of the present invention. The second embodiment will be explained herebelow focusing on the difference between it and the first embodiment. In the following embodiments described below, the same parts as in the first embodiment are indicated with the same reference numerals.

Referring to FIGS. 8, 9, in the second embodiment, a circular sensor chip 4 is bonded to the upper surface of the diaphragm 1b of the sensing body 1 through low melting point glass, adhesive or the like. The sensor chip 4 is made of single-crystal silicon having approximately (100) plane orientation, and has a thickness of for example approximately 0.2 mm and a diameter of for example approximately 3.5 mm. Four strain gauge resistors 3a, 3b, 3c, 3d are disposed on the surface of the sensor chip 4.

The single-crystal silicon of the sensor chip 4 has <110> directions perpendicular to one another and parallel to the surface plane of the sensor chip 4. As shown in FIG. 9, as in the first embodiment, the strain gauge resistors 3a–3d are disposed point-symmetrically with respect to the center point O of the sensor chip 4 on the x, y axes extending in the <110> directions perpendicular to one another to pass through the center point O.

Thermal stress distribution on the surface of the sensor chip 4 was analyzed by the finite element method in a state where a predetermined temperature difference (e.g. 95° C.) was given to the pressure detecting apparatus including the circular sensor chip 4 and no pressure was applied to the diaphragm 1b. The result is shown in FIG. 10. FIG. 10 closely resembles FIG. 5 in the first embodiment when they are compared. Accordingly, even when the circular sensor chip 4 is used, as in the first embodiment, the sensitivity can be improved while reducing the detection error, and the linearity of the output voltage with respect to the pressure to be detected becomes sufficient.

(Third Embodiment)

Figure 11:
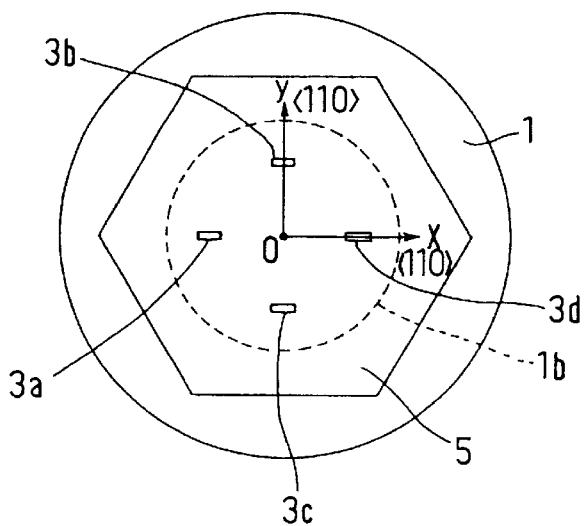
FIG. 11 is a plan view showing a sensor chip in a third preferred embodiment.
Figure 12:
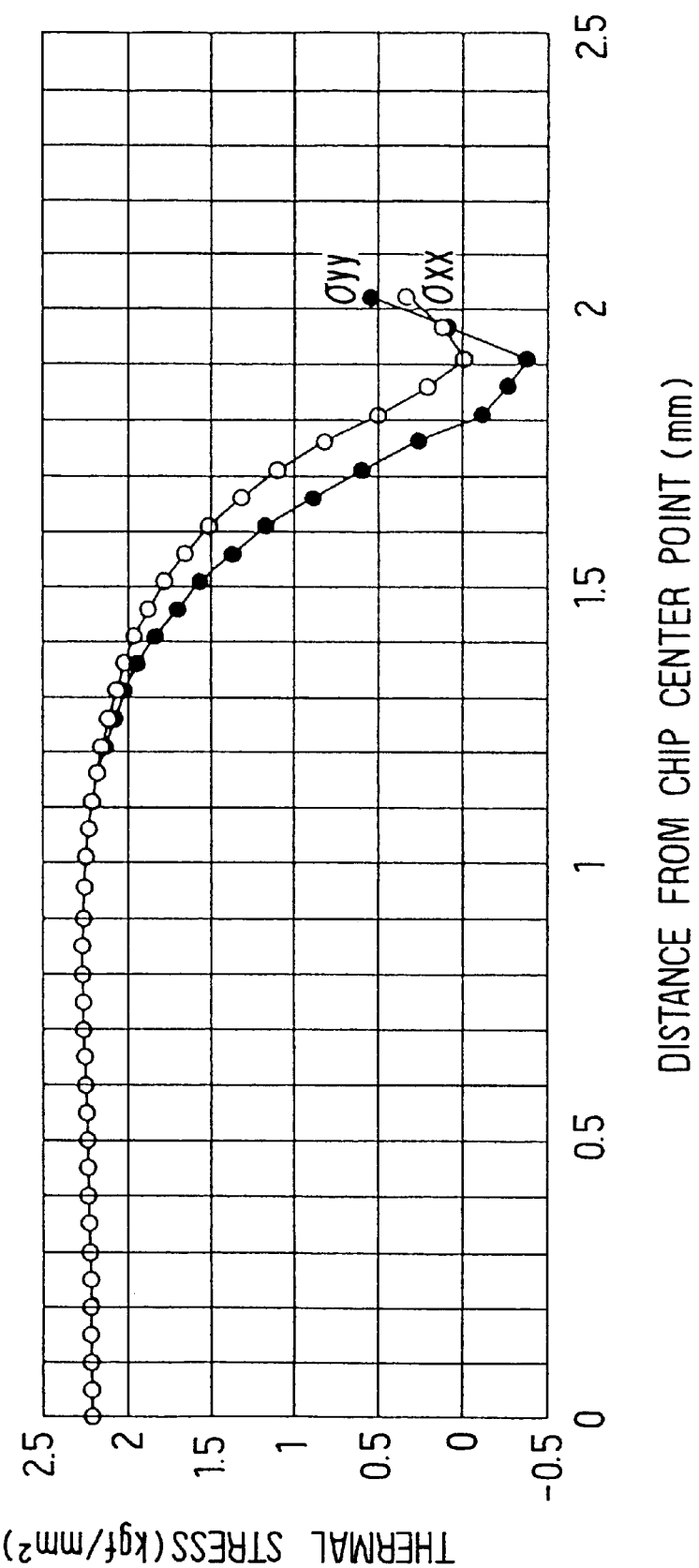
FIG. 12 is a graph showing thermal stress distribution produced on the surface of the sensor chip along an x axis of FIG. 11.
Figure 13:
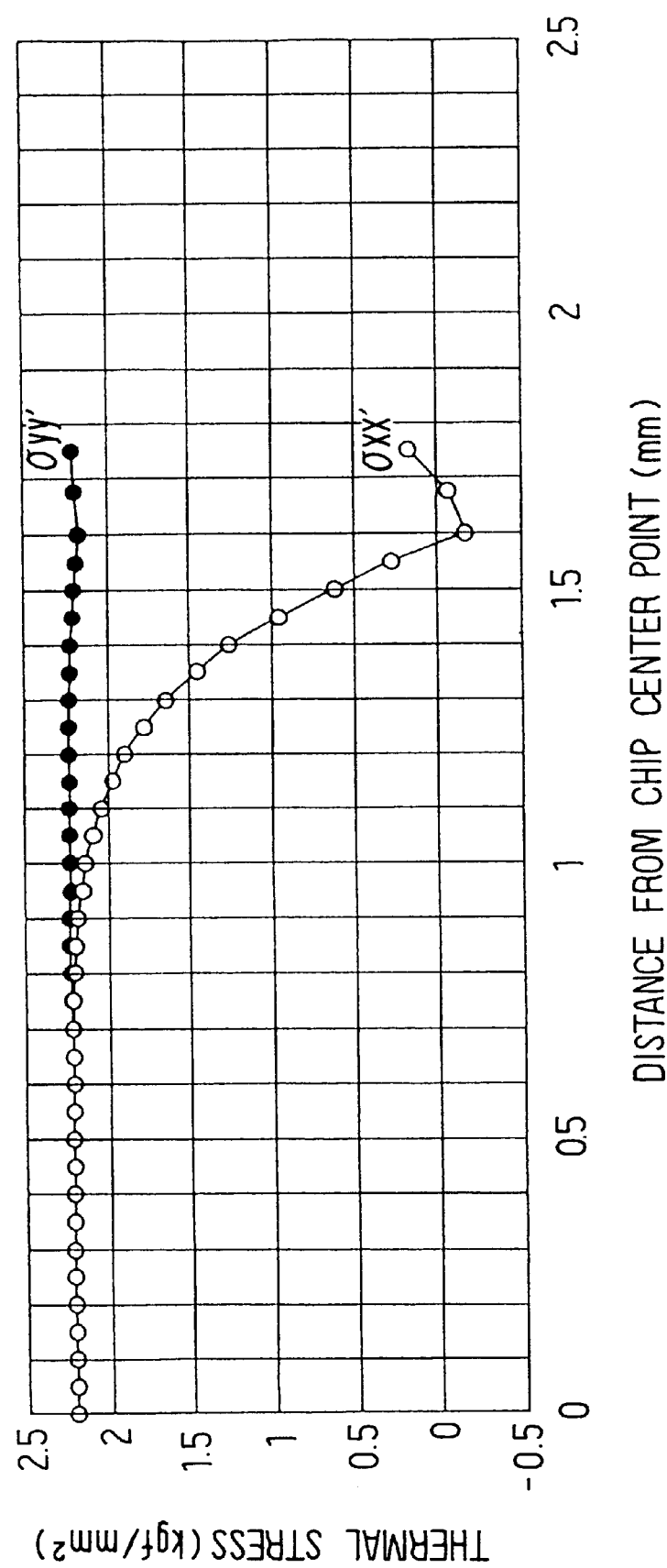
FIG. 13 is a graph showing thermal stress distribution produced on the surface of the sensor chip along a y axis of FIG. 11.

FIGS. 11–13 show a third preferred embodiment of the present invention. The third embodiment will be explained below focusing on the difference between it and the first embodiment.

Referring to FIG. 11, in the third embodiment, a sensor chip 5 having a regular hexagonal shape is bonded to the upper surface of the diaphragm 1b of the sensing body 1 by utilizing low melting point glass, adhesive or the like. The sensor chip 5 is made of single-crystal silicon, the plane orientation of which is almost (100), and has a thickness of approximately 0.2 mm and a dimension between opposite sides of approximately 3.5 mm for example. In this case, a length of a diagonal line is approximately 4 mm. Four strain gauge resistors 3a, 3b, 3c, 3d are formed on the surface of the sensor chip 5.

In this case, in the sensor chip 5, one of the <110> directions (x axis) of the single-crystal silicon is set to be parallel to a predetermined diagonal line of the sensor chip 5, while the other of the <110> directions (y axis) of the single-crystal silicon is set to be perpendicular to predetermined opposite sides of the sensor chip 5. The strain gauge resistors 3a, 3d are disposed on the x axis and the strain gauge resistors 3b, 3c are disposed on the y axis.

FIG. 12 shows thermal stress distribution at a plurality of points on the x axis (<110> direction) in FIG. 11 on the surface of the sensor chip 5, and FIG. 13 shows thermal stress distribution at a plurality of points on the y axis in FIG. 11 on the surface of the sensor chip 5. The thermal stress distributions were analyzed by the finite element method in the state where a predetermined temperature difference (e.g. 95° C.) was given to a pressure detecting apparatus including the regular hexagonal sensor chip 5 and no pressure was applied thereto. In FIGS. 12, 13, the thermal stress distributions are indicated in a decomposed state that each of the stresses is decomposed into a stress σxx, σxx' in the x axis direction and a stress σyy, σyy' in the y axis direction at each point.

It can be seen from FIGS. 12, 13 that when the strain gauge resistors 3a–3d are disposed at positions having distances from the center point O being approximately 0.9 mm or less, and more preferably being approximately 0.7 mm or less, the difference between the thermal stresses in the x axis and y axis directions becomes approximately zero and the detection error is reduced. Accordingly, the third embodiment also provides substantially the same effects as in the first embodiment.

As a result of analyses by the finite element method described in the above embodiments, when the plane shape of the sensor chip is close to circle, the thermal stress is reduced, though there is some difference. When it is assumed to form the plane shape of the sensor chip into a polygon here, it is conceivable to compare a circumscribed circle diameter of the polygon with an inscribed circle diameter of the polygon, as a criterion for judging the polygon how close to circle it is. That is, when a value of the circumscribed circle diameter relative to the inscribed circle diameter is δ, δ of a polygon unlimitedly close to a true circle is almost 1. A regular octagon has δ being approximately 1.082, and a square shape has δ being approximately 1.414.

As a result of study that how close to the circle the polygon should be to reduce the difference in thermal stress, it was found that the polygon having δ smaller than 1.2 can desirably reduce the difference in thermal stress. In practice, when the sensor chip has a hexagonal shape as in the third embodiment or other one which is close to the circle than the hexagonal shape, the difference in thermal stress can be desirably reduced. Accordingly, the adverse effect of the thermal stress caused by the difference in linear thermal expansion coefficient between the metallic diaphragm and the sensor chip can be minimized to reduce the detection error just by changing the plane shape of the sensor chip, while keeping high sensitivity.

(Fourth Embodiment)

In the above described embodiments, the sensor chip is made of single-crystal silicon having (100) plane orientation; however the sensor chip may be made of single-crystal silicon having (110) plane orientation, provided that an object is to reduce the detection error by the effect of the shape of the sensor chip.

Figure 14:
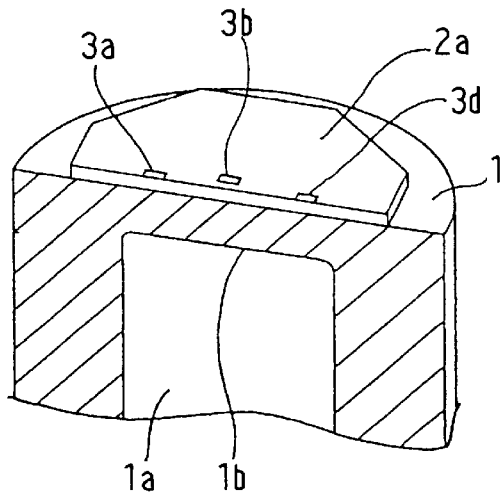
FIG. 14 is a perspective view partially showing a pressure detecting apparatus in a fourth preferred embodiment.
Figure 15:
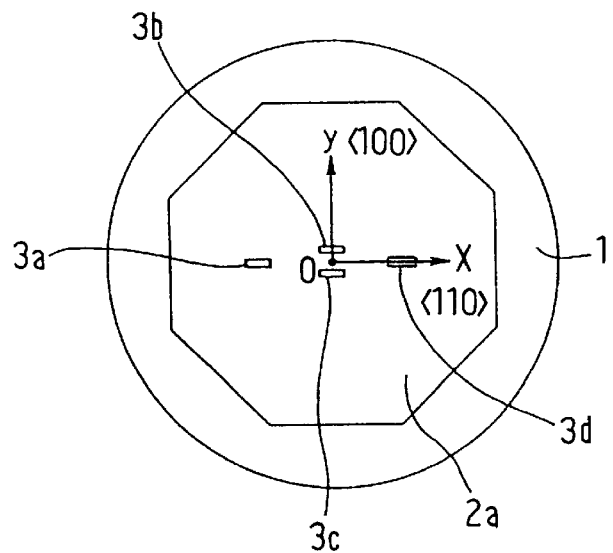
FIG. 15 is a plan view showing a sensor chip of the pressure detecting apparatus of FIG. 14.

FIGS. 14, 15 show a fourth preferred embodiment of the present invention adopting such a structure. That is, when a sensor chip 2a is made of single-crystal silicon having (110) plane orientation, it is necessary that arrangement of strain gauge resistors 3a–3d on the sensor chip 2a is changed from that shown in FIGS. 1, 2 to that shown in FIGS. 14, 15. The strain gauge resistors 3a–3d also compose the Wheatstone bridge circuit shown in FIG. 3 as described in the first embodiment.

When the plane orientation of the sensor chip 2a is (110) as described above, as shown in FIG. 15, the single-crystal silicon has a <100> direction and a <110> direction perpendicular to one another and parallel to the surface plane of the single-crystal silicon. An axis parallel to the <110> direction and passing through the center point O of the sensor chip 2a is referred to as an x axis and an axis parallel to the <100> direction and passing through the center point O is referred to as a y axis. In this case, a pair of strain gauge resistors 3b, 3c positioned on the opposite sides of the Wheatstone bridge circuit are disposed at the central portion of the sensor chip 2a along the y axis, and a pair of strain gauge resistors 3a, 3d positioned on the other opposite sides of the Wheatstone bridge circuit are disposed at peripheral portions of the sensor chip 2a along the x-axis.

Because only a stress σxx in the x axis direction is involved in the piezo resistance effect at this time, the above-described equation (5) is transformed to the following equation (6):

$$V_{out} = (\pi 44/4)(\sigma xxc - \sigma xxs)V \qquad (6)$$

wherein σxxc is a stress in the x axis direction of the strain gauge resistors 3a, 3d and σxxs is a stress in the x axis direction of the strain gauge resistors 3a, 3d. These values can be mostly known from the characteristic chart (FIG. 4) described above.

According to the analysis conducted by the inventor of the present invention using the finite element method, the stress distribution in the x axis direction from the center point O of the sensor chip 2a has almost the same tendency with that shown in FIG. 4 when a pressure is applied to the sensor chip 2a. That is, the stress σxx in the x axis direction provides a relatively large difference between the central portion of the sensor chip 2a where the strain gauge resistors 3b, 3c are disposed and the peripheral portion where the strain gauge resistors 3a, 3d are disposed. Accordingly, a difference between the rate of change in resistance of the strain gauge resistors 3b, 3c and that of the strain gauge resistors 3a, 3d becomes large and the output voltage level $V_{out}$ of the Wheatstone bridge circuit becomes large as it is apparent also from the equation (6).

Further, according to the analysis by the finite element method, the thermal stress distribution in the x axis direction from the center point O of the sensor chip 2a has almost the same tendency as that shown in FIG. 5. That is, the thermal stress σxx in the x axis direction hardly changes in a range of zero to approximately 0.8 mm in distance from the center point O of the sensor chip 2 and slightly changes in a range of 0.8 mm to 1 mm in distance. Therefore, it is preferable that the strain gauge resistors 3b, 3c are disposed at the central portion of the sensor chip 2a and the strain gauge resistors 3a, 3d are disposed at the positions apart form the center point O by approximately 1 mm or less, and more preferably by approximately 0.8 mm or less. Accordingly, the difference between the thermal stress applied to the strain gauge resistors 3b, 3c and the thermal stress applied to the strain gauge resistors 3a, 3d can be almost zero. Consequently, the output voltage level $V_{out}$ including a small thermal stress offset voltage is obtained from the Wheatstone bridge circuit and thereby the sensitivity can be improved with a small detection error.

(Fifth Embodiment)

FIGS. 16–19 show a fifth preferred embodiment of the present invention, and herebelow only points different from the first embodiment will be described.

Figure 16:
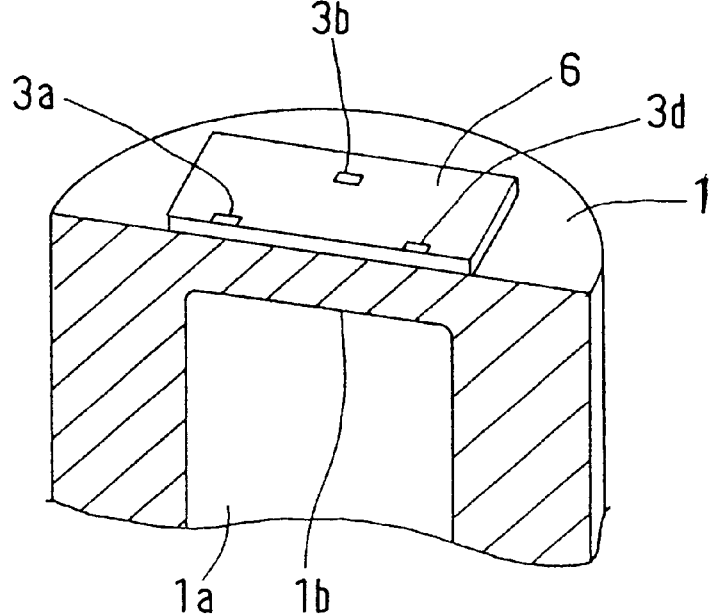
FIG. 16 is a perspective view partially showing a pressure detecting apparatus in a fifth preferred embodiment.
Figure 17:
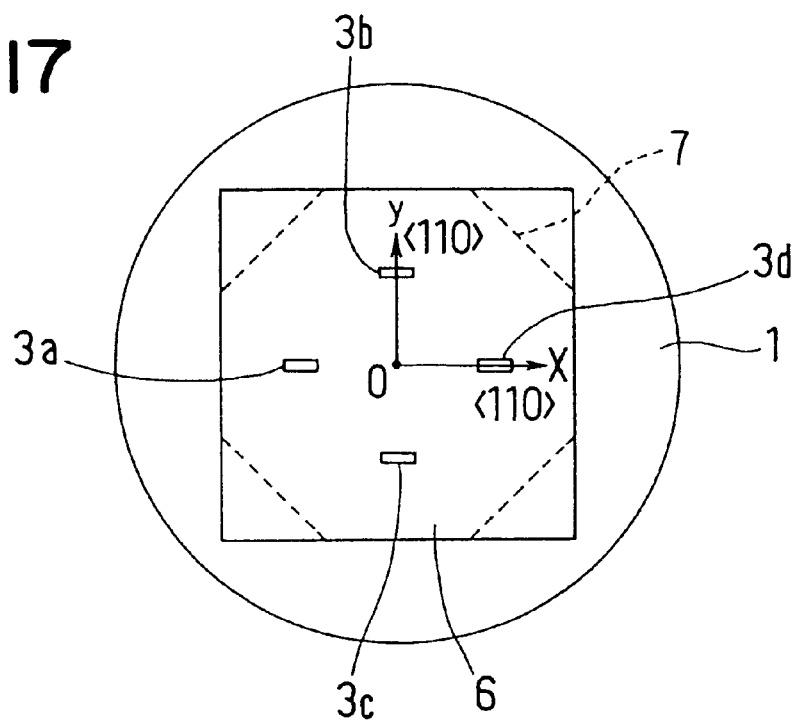
FIG. 17 is a plan view showing a sensor chip of the pressure detecting apparatus of FIG. 16.

Referring to FIGS. 16, 17, a rectangular plate-like sensor chip 6 made of single-crystal silicon (single-crystal semiconductor), a plane orientation of which is almost (100), is bonded to the upper surface of the metallic diaphragm 1b formed at the upper portion of the metallic sensing body 1 through low melting point glass as an adhesive (see FIG. 17). It is noted that the size of each part of the sensing body 1 is the same as those in the first embodiment.

More specifically, the sensor chip 6 is formed into a square shape (e.g., about 3.5 mm square with a thickness of about 0.2 mm). The single-crystal silicon forming the sensor chip 6 has <110> directions perpendicular to one another and parallel to the surface plane thereof as in the first embodiment. Each of the <110> directions is parallel to two sides of the sensor chip 6 and is perpendicular to the other two sides of the sensor chip 6. Further, as in the first embodiment, four strain gauge resistors 3a, 3b, 3c, 3d composing the Wheatstone bridge circuit (see FIG. 3) for taking out a signal are formed on the surface of the sensor chip 6. The respective four strain gauge resistors 3a–3d are disposed point-symmetrically with respect to the center point O of the sensor chip 6 on x, y axes. Incidentally, the x axis is parallel to one of the <110> directions and passes through the center point O, and the y axis is parallel to the other of the <110> directions and passes through the center point O of the chip.

In addition, as shown in FIG. 17, the low melting point glass 7 is formed to have a plane shape of a regular octagon with four sides respectively extending along (while overlapping with) the four sides of the sensor chip 6. Accordingly, the low melting point glass 7 has two sides perpendicular to the x axis, and two sides perpendicular to the y axis. The distance between the opposite sides of the low melting point glass 7 is approximately 3.5 mm corresponding to that of the sensor chip 6.

Figure 18:
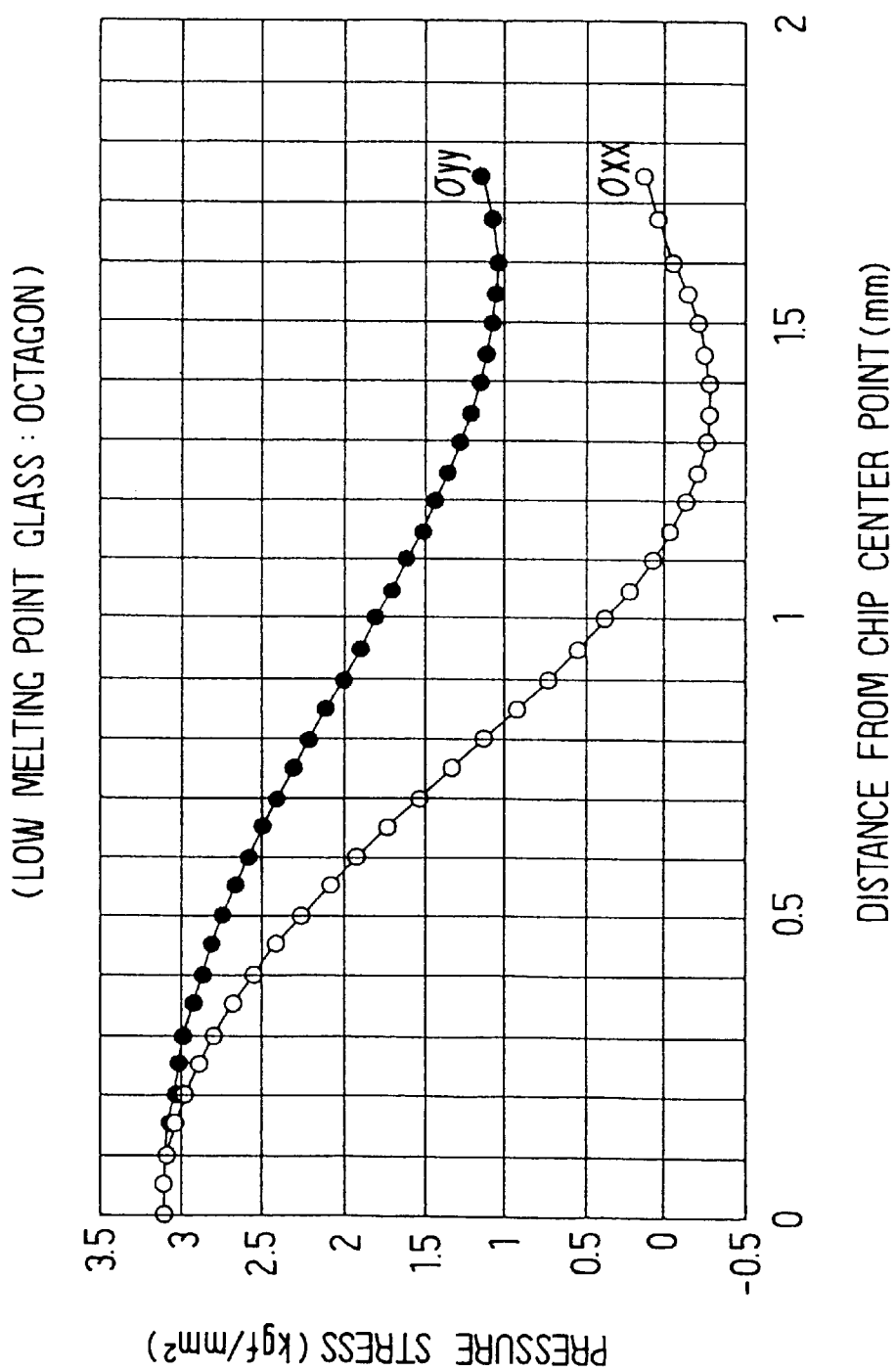
FIG. 18 is a graph showing stress distribution produced on the surface of the sensor chip in accordance with an applied pressure in the fifth embodiment in which a low melting point glass disposed between the sensor chip and a diaphragm is octagonal.

Stress distribution on the surface of the sensor chip 6 when a pressure was applied to the sensor chip 6 was analyzed by the finite element method. The result is shown in FIG. 18 in which stresses at a plurality of points along the x axis in FIG. 17 are indicated with stresses σxx in the x axis direction and stresses σyy in the y-axis direction. When FIG. 18 is compared with FIG. 4 showing the similar analytical result in the first embodiment, it can be seen that FIGS. 4, 18 have very similar profiles to one another. As understood from FIG. 18 and the above-described equation (5), it is desirable for the strain gauge resistors 3a–3d to be disposed at positions as far as possible from the center point O of the sensor chip 6. Accordingly, the output voltage level $V_{out}$ is increased to improve the sensitivity.

Figure 19:
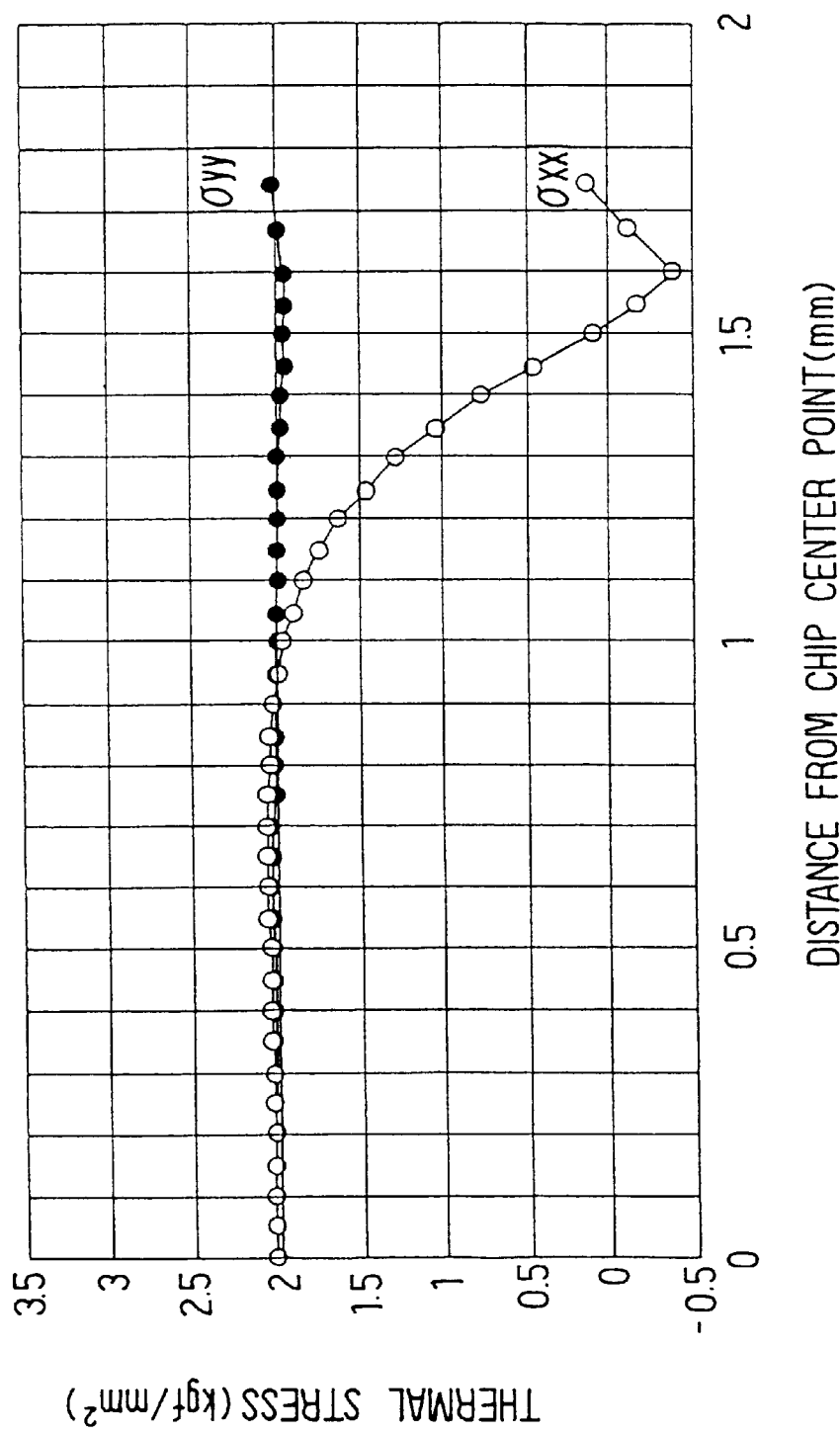
FIG. 19 is a graph showing thermal stress distribution produced on the surface of the sensor chip in the fifth embodiment.

Next, in the present embodiment, thermal stress distribution on the surface of the sensor chip 6 was analyzed by the finite element method, in the sate where a predetermined temperature difference (e.g. 95° C.) was given to the pressure detecting apparatus in which the square sensor chip 6 is bonded to the diaphragm 1b through the regular octagonal low melting point glass 7, and no pressure was applied to the sensor chip 6. The result is shown in FIG. 19, in which thermal stresses at a plurality of points along the x-axis in FIG. 17 are indicated with stresses σxx in the x-axis direction and stresses σyy in the y-axis direction. When FIG. 19 is compared with FIG. 5 showing the similar analytical result in the first embodiment, they have very similar profiles.

Accordingly, it can be seen from FIGS. 17, 19 that when the strain gauge resistors 3a–3d are disposed at the positions apart from the center point O by approximately 1 mm or less, and more preferably by approximately 0.8 mm or less, the difference between the thermal stresses in the x axis and y axis directions at the respective position becomes almost zero. As a result, the detection error can be prominently reduced.

That is, even when the sensor chip 6 has a square shape, when the low melting point glass 7 fixing the sensor chip 6 to the diaphragm 1b has an octagonal shape, the same effects as in the first embodiment in which the sensor chip 2 has a regular octagonal shape can be provided. The strain gauge resistors 3a–3d are disposed on the single-crystal silicon having (100) plane orientation to be point-symmetrical with respect to the center point O as in the first embodiment, when the pressure is applied to the diaphragm 1b, the incremental values of resistance of the strain gauge resistors 3b, 3c becomes equal to the decremental values of resistance of the strain gauge resistors 3a, 3d. As a result, linearity of an output voltage with respect to the pressure to be detected is improved.

Still more, because the sensor chip has a square shape, the layout of the sensor chips 6 on a semiconductor wafer is simplified and then the sensor chips 6 can be readily divided into respective pieces by a dicing process of the wafer and waste space is reduced, resulting in improvement of productivity and yield of the sensor chips 6.

Figure 20:
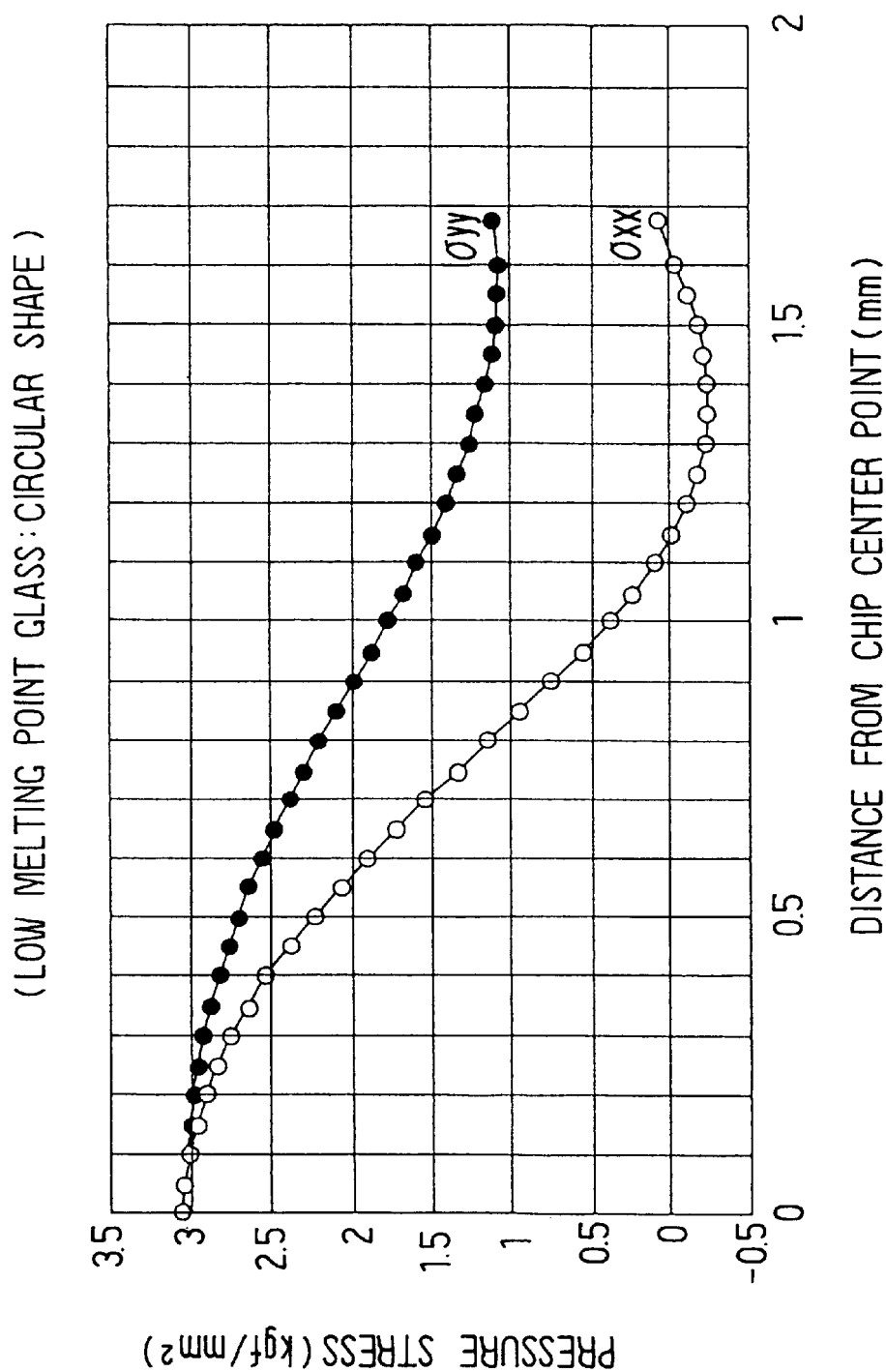
FIG. 20 is a graph showing stress distribution produced on the surface of the sensor chip in accordance with an applied pressure in a modified embodiment of the fifth embodiment, in which the low melting point glass is circular.

Next, as a modified embodiment of the fifth embodiment, the low melting point glass 7 was formed to have a circular shape of approximately 3.5 mm in diameter at a planar distribution state, and in this sate, stress distribution on the surface of the sensor chip 6 when a pressure was applied to the diaphragm 1b was analyzed by the finite element method. The result is shown in FIG. 20. Further, in the same state, thermal stress distribution on the surface of the sensor chip 6 was also analyzed by the finite element method under the same conditions as for FIG. 19, and the result is shown in FIG. 21.

Figure 21:
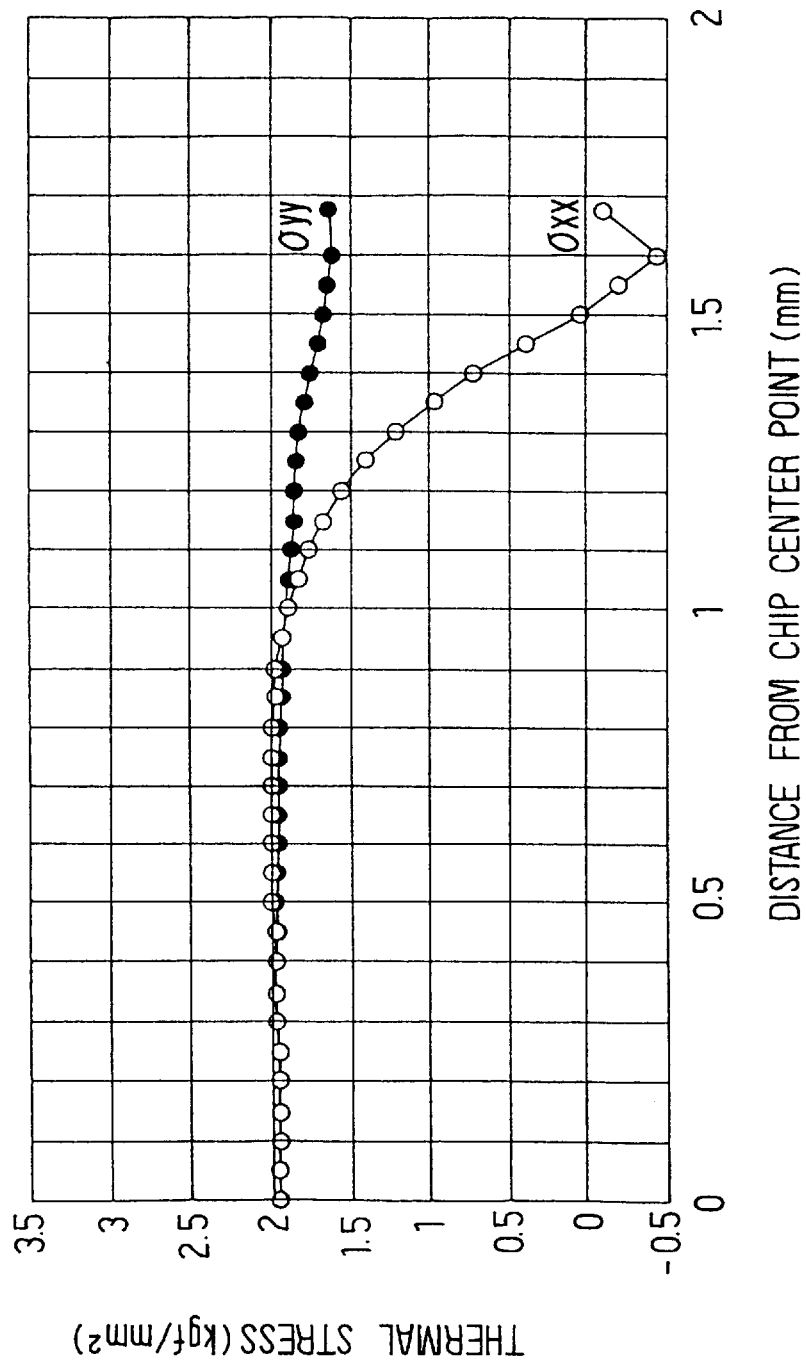
FIG. 21 is a graph showing thermal stress distribution produced on the surface of the sensor chip in the modified embodiment in which the low melting point glass is circular.

When FIGS. 20, 21 are compared with FIGS. 18 and 19 showing the analytical results in the state where the plane shape of the low melting point glass 7 is regular octagonal with a length between opposite sides being about 3.5 mm, they have very similar profiles to one another. Accordingly, even when the plane shape of the low melting point glass 7 is circular, the same effects as the fifth embodiment are provided.

Figure 22:
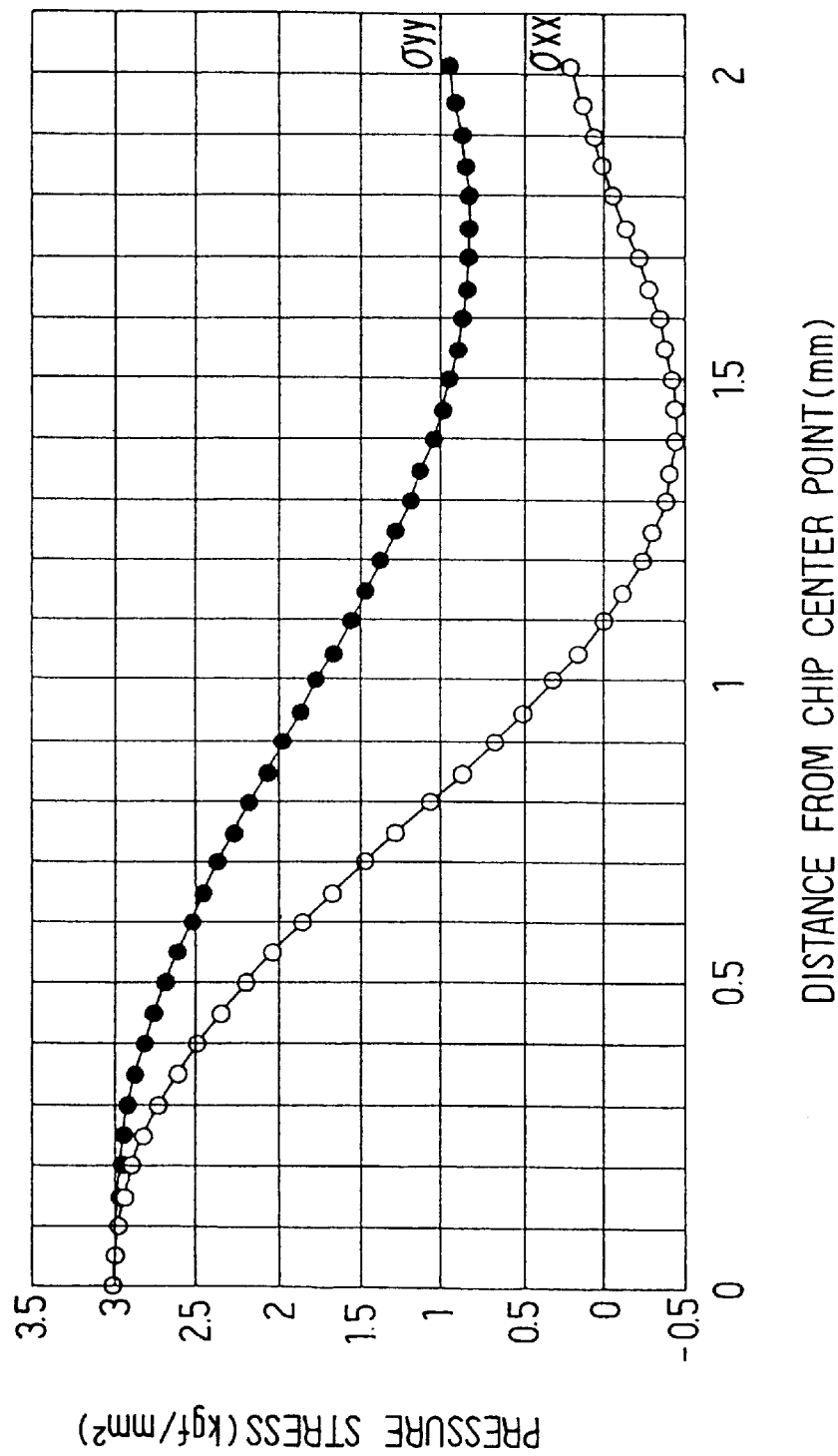
FIG. 22 is a graph showing stress distribution produced on the surface of the sensor chip in accordance with an applied pressure in another modified embodiment of the fifth embodiment, in which the low melting point glass is hexagonal.
Figure 23:
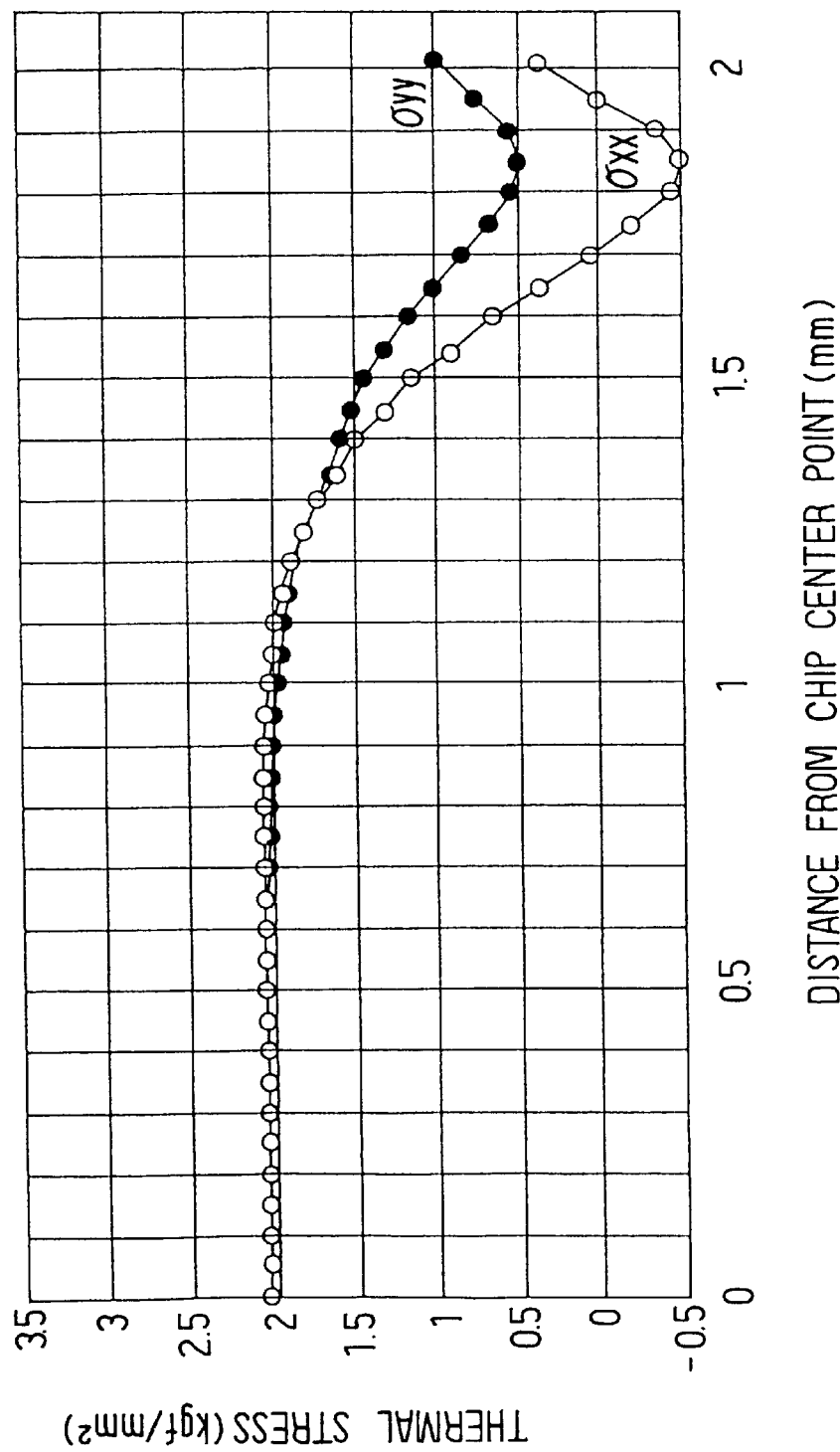
FIG. 23 is a graph showing thermal stress distribution produced on the surface of the sensor chip in the modified embodiment in which the low melting point glass is hexagonal.

Also, as another modified embodiment of the fifth embodiment, the low melting point glass 7 was formed to have a regular hexagonal shape with a length between opposite sides being about 3.5 mm and with a pair of opposite sides disposed along a pair of opposite sides of the sensor chip 6. In this sate, stress distribution on the surface of the sensor chip 6 when a pressure was applied to the diaphragm 1b was analyzed by the finite element method. The result is shown in FIG. 22. FIG. 23 shows thermal stress distribution on the surface of the sensor chip 6 disposed on the regular hexagonal low melting point glass 7, which was also analyzed by the finite element method under the same conditions as for FIG. 19. It can be seen that when FIGS. 22, 23 are compared with FIGS. 18, 19, they have very similar profiles. Accordingly, even when the plane shape of the low melting point glass 7 is regular hexagonal, the same effects as the fifth embodiment are provided.

That is, when the plane shape of the low melting point glass 7 for bonding the sensor chip 6 to the diaphragm 1b is a circle or a polygon close to a circle, the difference in thermal stress can be reduced, though there is some difference. When it is assumed to form the plane shape of the low melting point glass 7 into a polygonal shape, it is conceivable to compare a circumscribed circle diameter with an inscribed circle diameter of the polygon as a criterion for judging how close the shape of the polygon should be to a circle. That is, as described above, when a value of the circumscribed circle diameter relative to the inscribed circle diameter is δ, it was found that the polygon having δ smaller than 1.2 can reduce the difference in thermal stress. In practice, when the low melting point glass 7 has a hexagonal shape or other one which is close to the circle than the hexagonal shape, the difference in thermal stress can be reduced. Accordingly, the adverse effect of the thermal stress caused by the difference in linear thermal expansion coefficients between the metallic diaphragm and the sensor chip can be minimized. The detection error is reduced and yield of the sensor chip is improved by simply changing the plane shape of the low melting point glass 7.

(Sixth Embodiment)

While the sensor chip 6 is made of single-crystal silicon having (100) plane orientation in the fifth embodiment described above, the sensor chip may be made of single-crystal silicon having (110) plane orientation.

Figure 24:
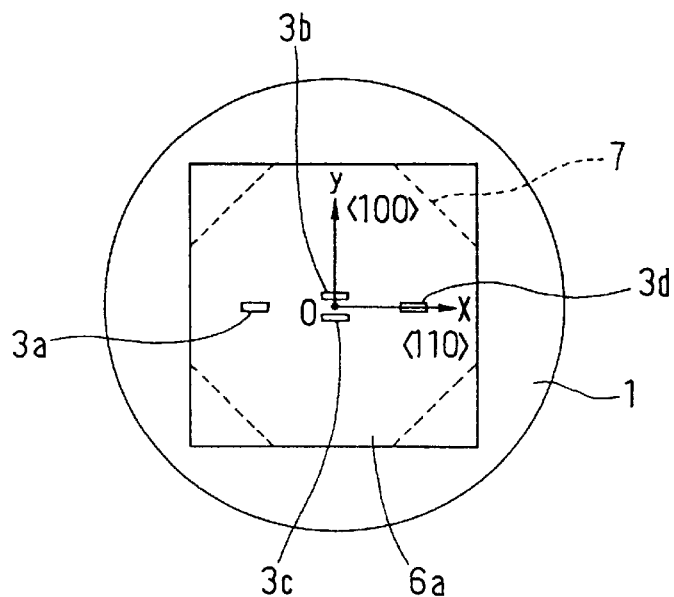
FIG. 24 is a plan view showing a sensor chip in a sixth preferred embodiment.

FIG. 24 shows a sixth preferred embodiment of the present invention adopting such a structure. That is, a sensor chip 6a on the sixth embodiment is made of single-crystal silicon having (110) plane orientation, and in this case the strain gauge resistors 3a–3d are disposed on the sensor chip 6a in the following way. The low melting point glass 7 has a regular octagonal shape.

That is, the sensor chip 6a has a <100> direction and a <110> direction, which are perpendicular to one another and are parallel to the surface plane of the sensor chip 6a. Then, a pair of strain gauge resistors 3b, 3c positioned on the opposite sides of the Wheatstone bridge circuit (see FIG. 3) are disposed at the central portion of the sensor chip 6a in the <100> direction, i.e., along the y axis, and a pair of strain gauge resistors 3a, 3d positioned on the other opposite sides of the Wheatstone bridge circuit are disposed at peripheral portions along the x axis.

In this case, the output voltage level $V_{out}$ is expressed by the above equation (6), and pressure stress distribution and thermal stress distribution on the surface of the sensor chip 6a are almost the same as those indicated in FIGS. 4, 5, as in the fourth embodiment, and accordingly the same effects as in the fourth embodiment can be provided. Incidentally, the plane shape of the low melting point glass 7 may be formed into a circle or a regular hexagon also in the sixth embodiment as a matter of course.

(Seventh Embodiment)

FIGS. 25–33 show a seventh present embodiment of the present invention, and herebelow only points different from the first embodiment will be explained.

Figure 25:
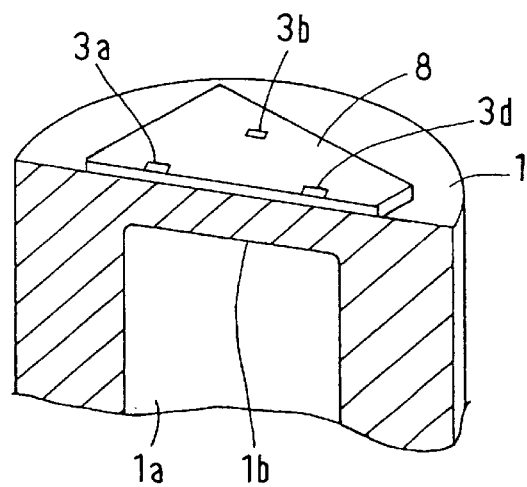
FIG. 25 is a perspective view showing a pressure detecting apparatus in a seventh preferred embodiment.
Figure 26:
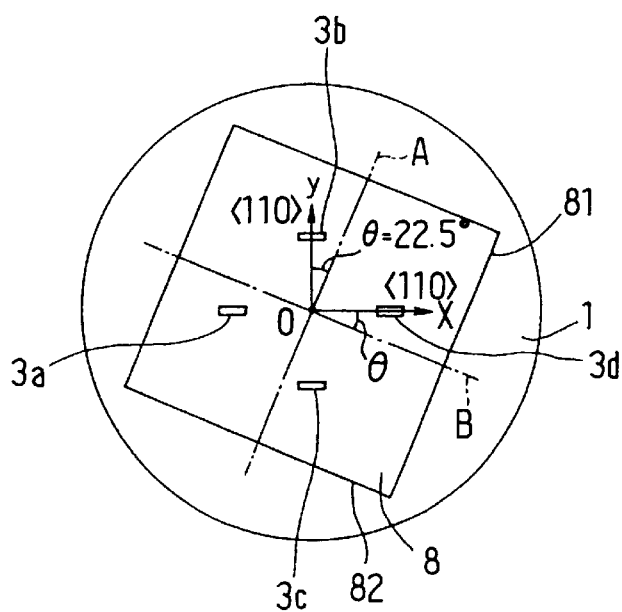
FIG. 26 is a plan view showing a sensor chip of the pressure detecting apparatus of FIG. 25.

Referring to FIGS. 25, 26, a rectangular plate-like sensor chip 8 made of single-crystal silicon (single-crystal semiconductor), plane orientation of which is almost (100), is bonded to the upper surface of the metallic diaphragm 1b formed at the upper portion of the metallic sensing body 1 by utilizing low melting point glass or adhesive (not shown). It is noted that dimensions of each part of the sensing body 1 is the same as those in the first embodiment. Further, the entire back face of the sensor chip 8 is bonded to the diaphragm 1b.

Specifically, the sensor chip 8 has a square shape (e.g., 3.5 mm square with a thickness of approximately 0.2 mm) in a plan view. The single-crystal silicon forming the sensor chip 8 has <110> directions perpendicular to one another and parallel to the surface plane of the sensor chip 8. Here, in the present embodiment, the sensor chip 8 is formed into the square shape such that each of the crystallographical directions, i.e., the <110> directions is rotated by a predetermined rotation angle Θ, e.g. 22.5°, with respect to a line parallel to the respective sides of the sensor chip 8. That is, when an axis passing through the center point O of the sensor chip 8 in parallel with one of the <110> direction is referred to as an x axis, and an axis passing through the center point O in parallel with the other of the <110> direction is referred to as a y axis, the predetermined rotation angle Θ is an angle defined between the y axis and a center line A parallel to a side 81 of the sensor chip 8 and is an angle defined between the x axis and a center line B parallel to a side 82 of the sensor chip 8. The side 81 is perpendicular to the side 82. Further, as in the first embodiment, the four strain gauge resistors 3a–3d composing the Wheatstone bridge circuit (see FIG. 3) are disposed on the surface of the sensor chip 8 so that positions where the four strain gauge resistors 3a–3d are disposed become point-symmetrical with respect to the center point O on the x, y axes.

In this arrangement, a pressure to be detected is applied to the diaphragm 1b on the pressure receiving port side, while a constant reference pressure (e.g. atmospheric pressure) is applied to the diaphragm 1b on the opposite side of the pressure receiving port 1a. Accordingly, the diaphragm 1b and the sensor chip 8 deflect together due to a difference between the applied pressures. The deflection of the sensor chip 8 is accompanied by strain deformation of the surface region thereof, which causes changes in value of resistance of the strain gauge resistors 3a–3d. As a result, the signal having the output voltage level $V_{out}$ corresponding to the pressure to be detected is output from the Wheatstone bridge shown in FIG. 3. The output voltage level $V_{out}$ is repressed by the equation (5) described above.

Further, as described above, when the pressure is applied to the diaphragm, the longer the distance of the position from the center point O becomes, the larger the difference between stresses in the x axis, y axis directions generated by the applied pressure on the surface of the sensor chip 8 becomes. Therefore, to increase the output voltage level $V_{out}$ to improve the sensitivity, it is necessary that the strain gauge resistors 3a–3d are disposed at the positions apart from the center point O as far as possible.

On the other hand, as described above, when a predetermined temperature difference is applied to the pressure detecting apparatus and no pressure is applied thereto, the longer the distance of the position from the center point O becomes, the larger the difference between thermal stresses in the x axis, y axis directions becomes. The difference in thermal stress causes the detection error. However, in the present embodiment, because the sensor chip 8 is formed such that each of the <110> directions and each of the sides 81, 82 make the predetermined rotation angle Θ of 22.5° therebetween, the region where the difference in thermal stress is almost zero expands to the position more distant from the center point O than the case where the <110> directions are parallel to the respective sides of the sensor chip.

Figure 27:
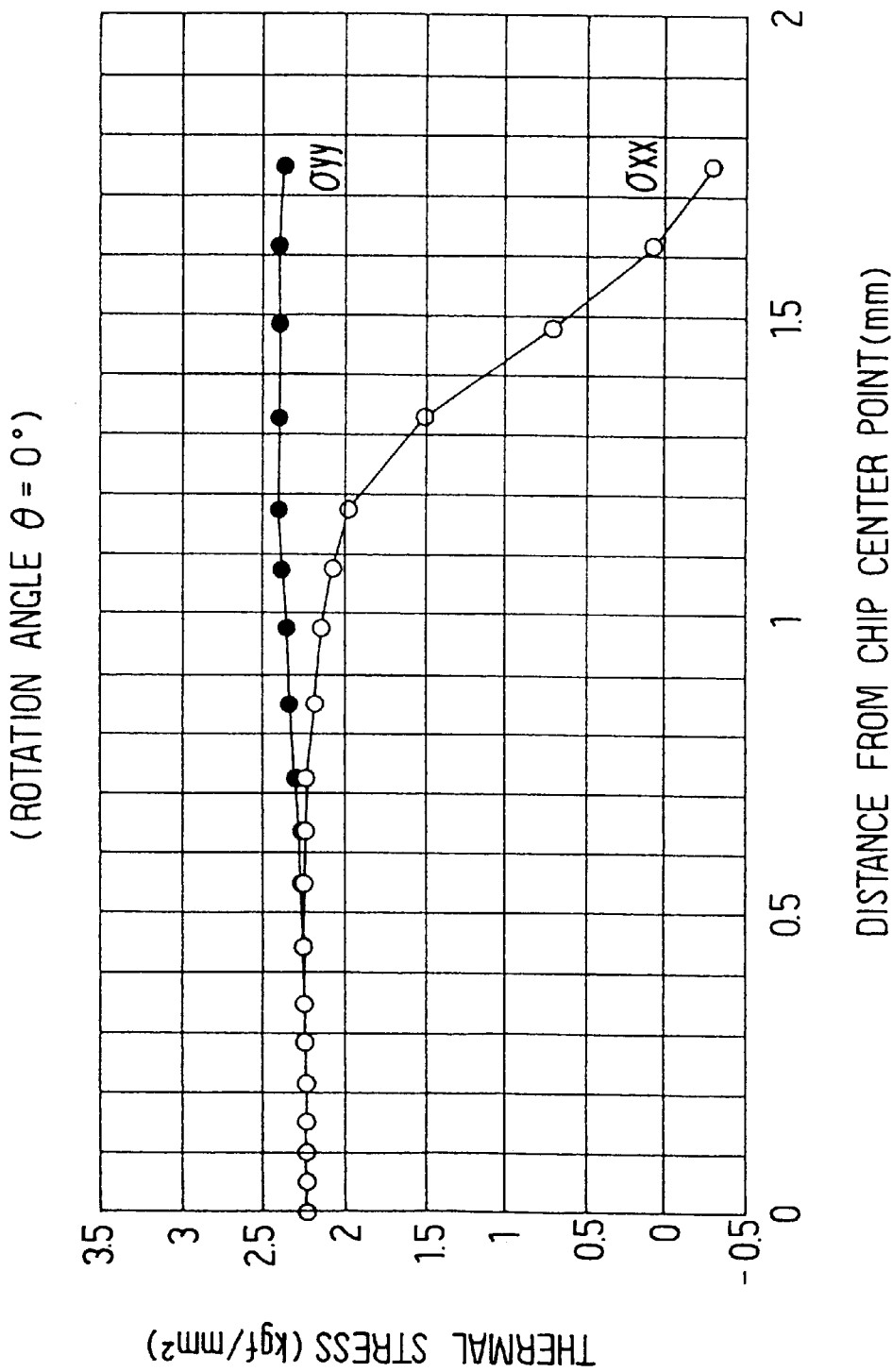
FIGS. 27–29 are graphs showing thermal stress distributions produced on the surface of the sensor chip, depending on rotation angle Θ of the sensor chip of 0°, 22.5°, 45°.
Figure 28:
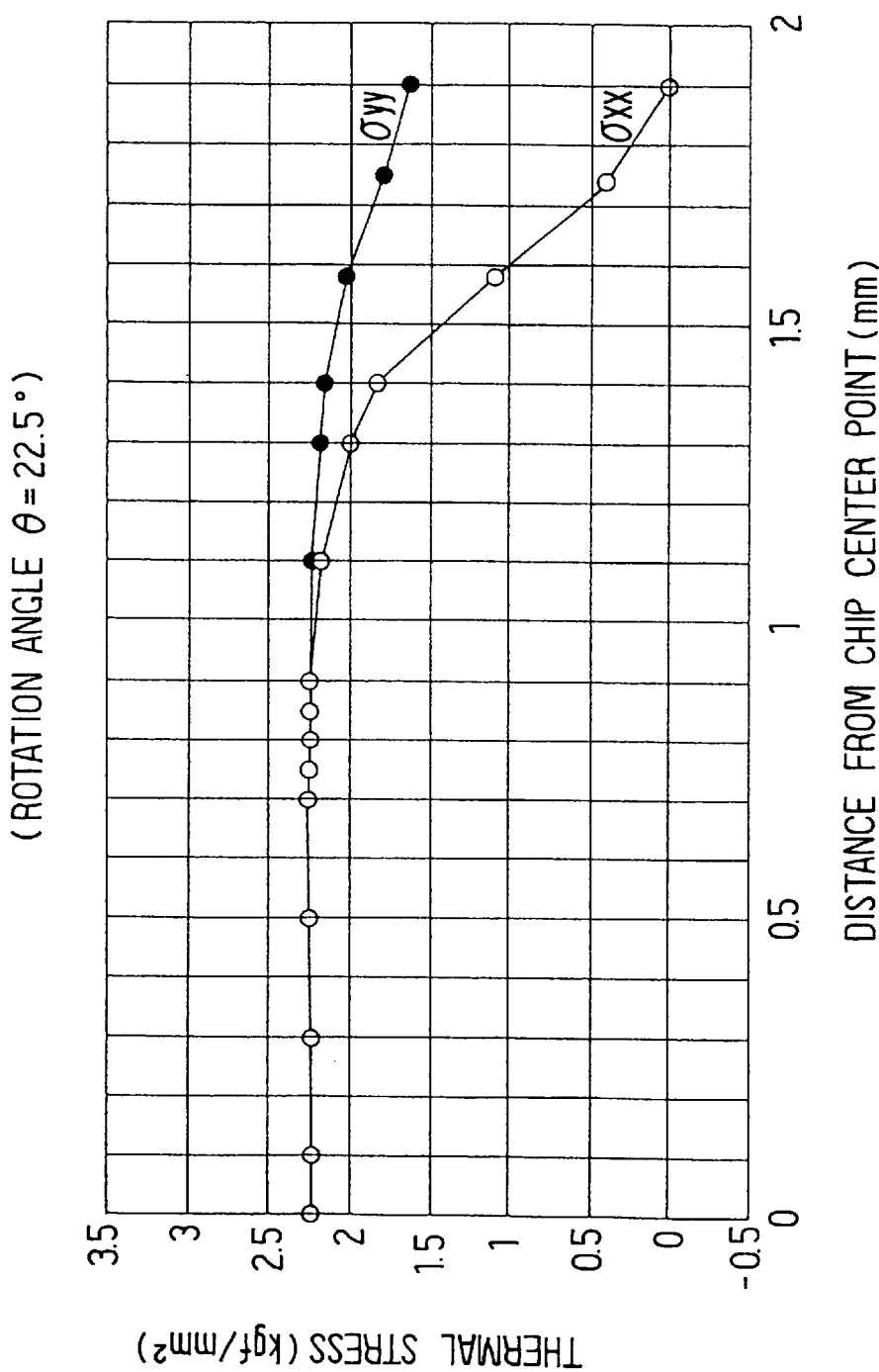
Figure 29:
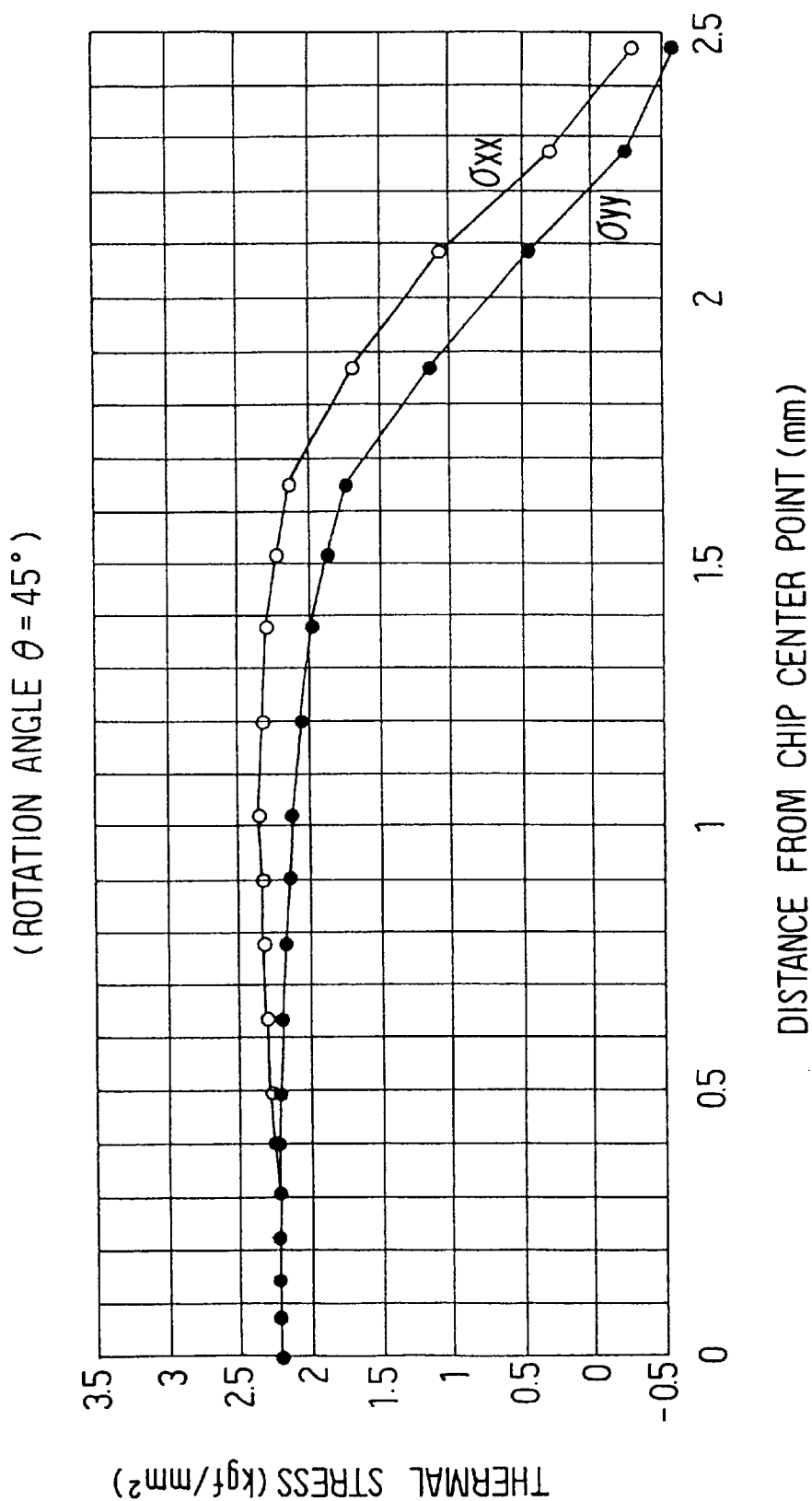

FIGS. 27–29 show thermal stress distributions of models which are assumed to respectively have the sensor chips 8 bonded to the diaphragms 1b at the entire back surfaces thereof and having the rotation angles Θ being respectively 0°, 22.5°, and 45°. Specifically, in the state where a predetermined temperature difference (e.g. 95° C.) was applied to the pressure detecting apparatus and no pressure was applied to the diaphragm 1b, the thermal stress distributions on the surfaces of the sensor chips 8 in the models were analyzed by the finite element method. In FIGS. 27–29, each of thermal stresses at a plurality of points along the x axis in FIG. 26 is decomposed into a stress σxx in the x axis direction and a stress σyy in the y axis direction.

As understood from the analytical results shown in FIGS. 27, 29, when the rotation angle Θ is 0° or 45° the difference between the stresses in the x axis, y axis directions, i.e., σyy−σxx, starts to expand from the position, a distance of which from the center point O exceeds approximately 0.4 mm to 0.5 mm. As opposed to this, when the rotation angle Θ is 22.5°, as shown in FIG. 28, the difference of the stresses is approximately zero in a region from the center point O to 0.9 mm from the center point O at least.

Accordingly, in the present embodiment, when the strain gauge resistors 3a–3d are disposed at the positions where the distances from the center point O are about 1 mm or less, more preferably about 0.9 mm or less, the difference between the thermal stresses in the x axis and the y axis directions may be almost zero. As a result, the detection error can be reduced. Further, the output voltage level $V_{out}$ can be prominently increased to improved the sensitivity. It also has an advantage that such effects may be obtained just by changing the direction of the crystallographical directions on the sensor chip 8, i.e., just by changing the arrangement of the strain gauge resistors on the sensor chip 8. Still more, because the shape of the sensor chip 8 is square, not only the layout of the sensor chips 8 on a semiconductor wafer is simplified but also the sensor chips 8 may be readily obtained by a dicing process of the wafer. As a result, the productivity and the yield of the sensor chips 8 are largely improved.

While the rotation angle Θ of the <110> direction on the sensor chip 8 with respect to the side of the sensor chip 8 is set at 22.5° in the seventh embodiment, the rotation angle Θ is not limited to it and may be changed to another angle as long as the angle allows to assure the region, by a certain degree, in which the difference between the thermal stresses in the x axis and y axis directions at the positions where the strain gauge resistors 3a–3d are disposed is almost zero.

Next, a tolerance of the rotation angle Θ will be described below. When the difference between thermal stresses in the x axis, y axis directions exists on the sensor chip, the zero point of the detected output voltage changes in accordance with temperature, thus posing a problem in its nonlinearity. Then, when such nonlinearity is to be compensated by an external circuit, there arises other problems that the circuit structure is complicated and that it requires a cumbersome control. Such a temperature nonlinearity of offset voltage (TNO) is a problem also in the present embodiment. TNO is expressed by the following equation (7):

$$TNO = -\{(V_{offset}(HT) - V_{offset}(RT))/(FS(HT-RT)) - (V_{offset}(LT) - V_{offset}(RT))/(FS(LT-RT))\} \cdot (LT-RT) \times 100[\%FS] \quad (7)$$

wherein $V_{offset}(T)$ is a zero point output voltage at temperature T, RT is room temperature, HT is the highest temperature within a fluctuation width of temperature, LT is the lowest temperature within the fluctuation width of temperature and FS is a full-scale output voltage width (span).

Figure 30:
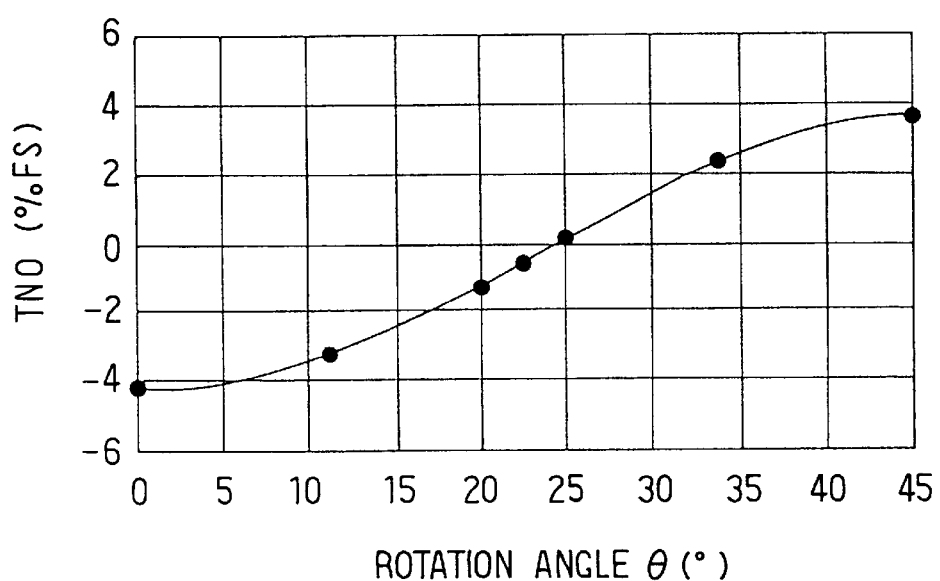
FIG. 30 is a graph showing a relationship between temperature nonlinearity of offset voltage (TNO) and rotation angle Θ.

FIG. 30 shows a result obtained by simulating the dependency of the TNO on the rotation angle Θ using a model having the basic structure in the seventh embodiment. It is noted that in this simulation, the distance of the strain gauge resistors from the center point O of the chip is assumed to be 0.8 mm and a formation region of each of the strain gauge resistors is assumed to be 0.2 mm square.

The state of the rotation angle Θ=0° in FIG. 30 corresponds to the conventional gauge arrangement on the square sensor chip, and an absolute value of TNO in this state is more than 4%FS. If it is effective for the compensation of the nonlinearity to reduce the absolute value of TNO to be half, it is sufficient to set the rotation angle Θ within a range from 15° to 33°. Incidentally, when the rotation angle Θ is zero, TNO is about 25° in FIG. 30. This is considered to be caused by the fact that the formation region of each of the strain gauge resistors is assumed to be square.

Figure 31:
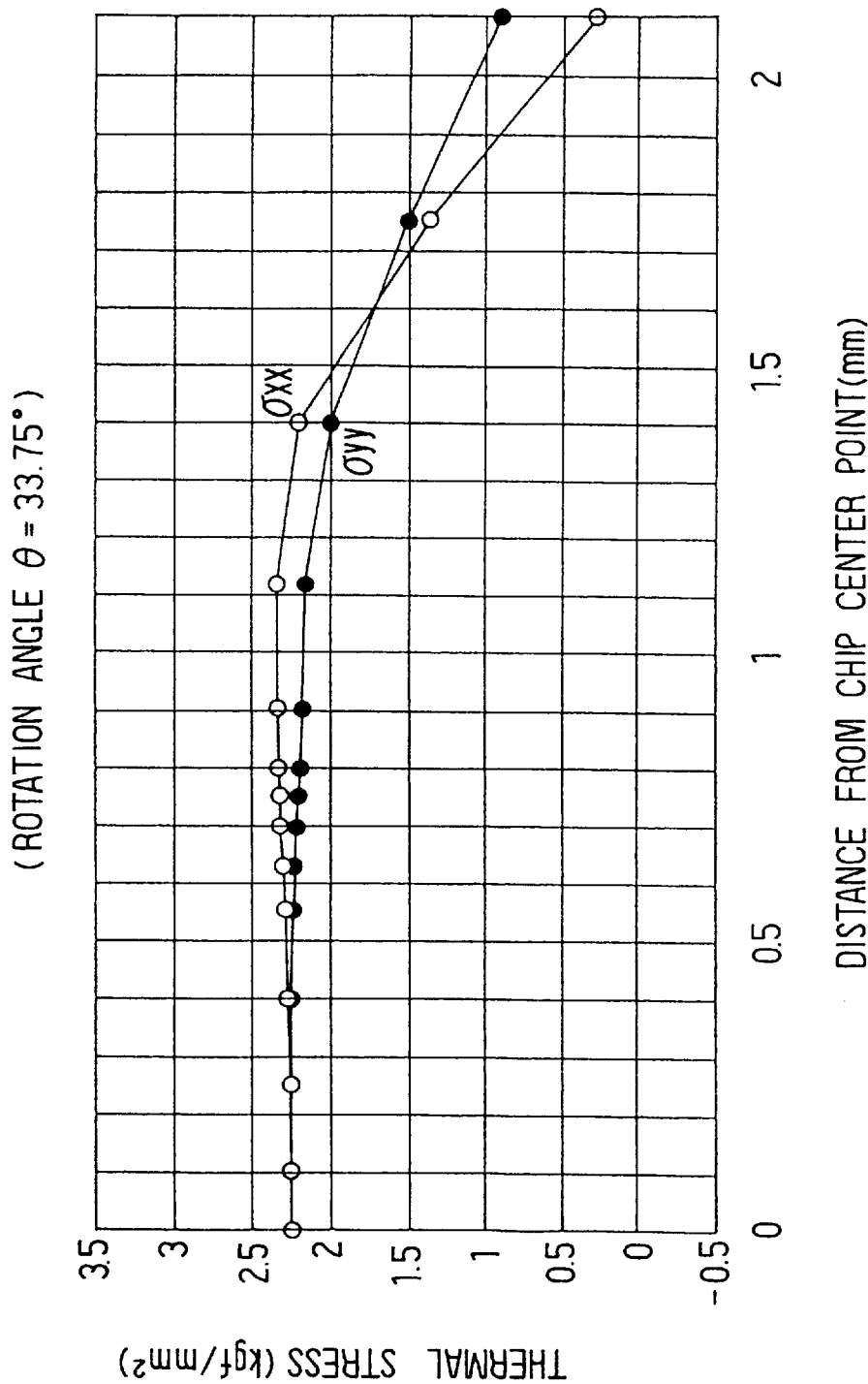
FIGS. 31–33 are graphs showing thermal stress distributions produced on the surface of the sensor chip, depending on rotation angle Θ of 33.75°, 37°, 40°.
Figure 32:
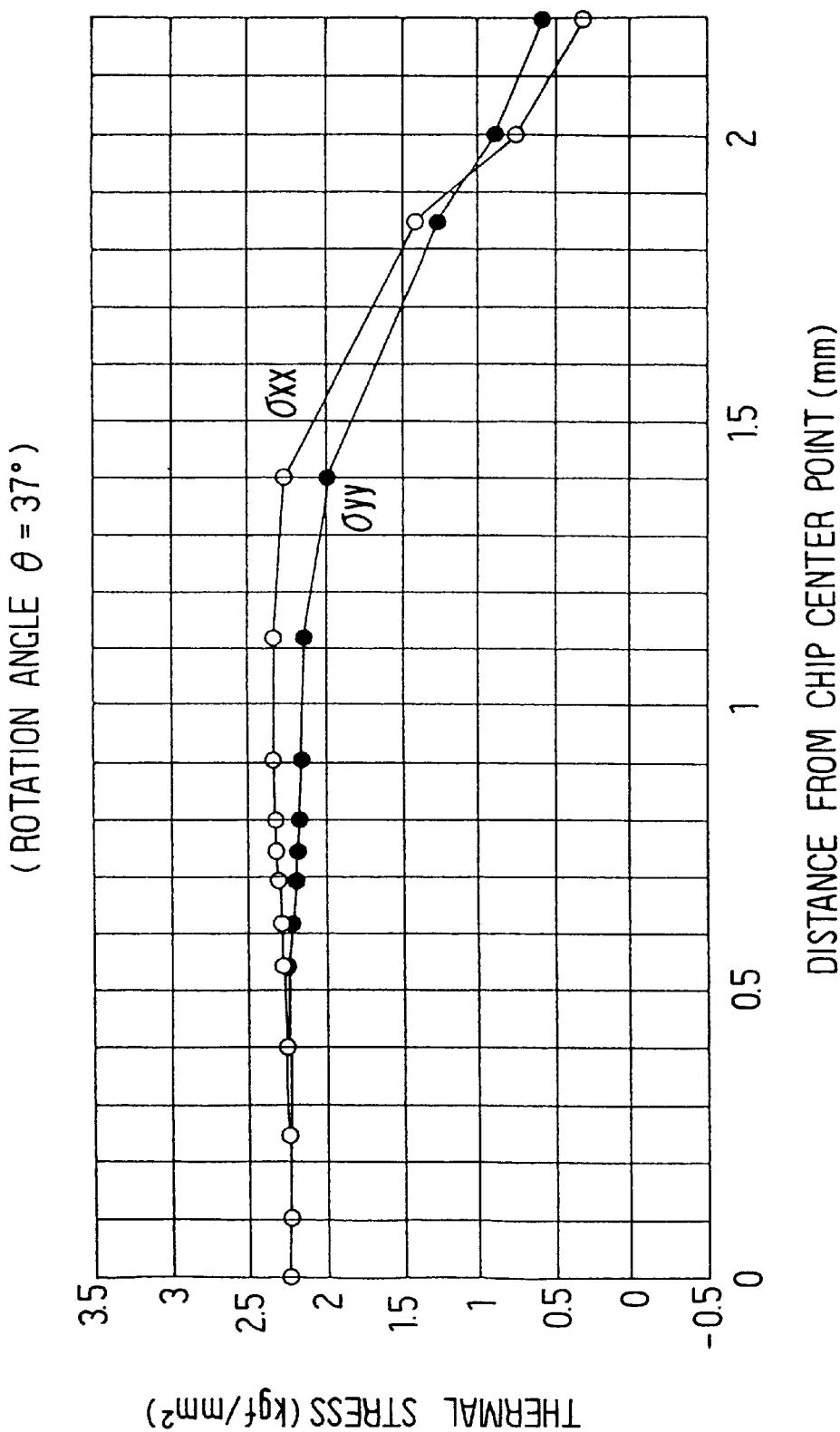
Figure 33:
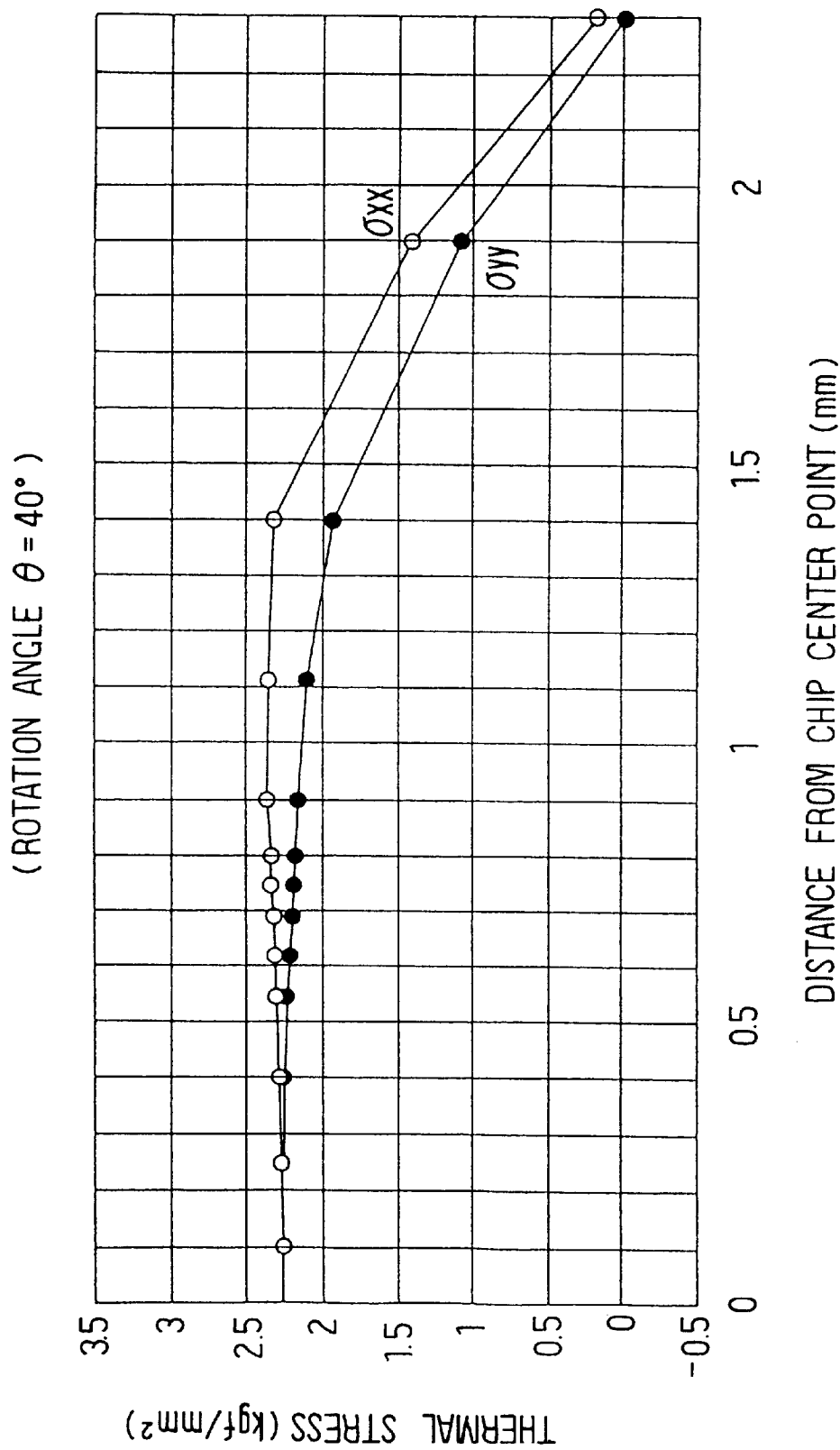

On the other hand, even when the rotation angle Θ is set at an angle larger than 33°, it is possible for the difference between the thermal stresses in the x axis and y axis directions, which might cause the detection error, to be zero. FIGS. 31–33 show analytical results of thermal stress distributions on the surfaces of the square sensor chips 8 of models in which the rotation angles Θ are respectively 33.75°, 37°, and 40°. In each of the models, the sensor chip 8 is bonded to the diaphragm 1b at the entire back surface thereof as described above. The thermal stress distributions shown in FIGS. 31–33 were respectively analyzed by the finite element method in the state where a predetermined temperature difference (e.g. 95° C.) was given to the pressure detecting apparatus and the applied pressure was zero. In FIGS. 31–33, the thermal stress distributions are indicated in a decomposed state that each of the thermal stresses at a plurality of points along the x axis in FIG. 26 is decomposed into a stress σxx in the x axis direction and a stress σyy in the y axis direction at respective points.

The following points can be seen from the analytical results described above. That is, in the model shown in FIG. 31 in which the rotation angle Θ is 33.75°, the difference between the thermal stresses in the x axis and y axis directions, i.e., (σyy−σxx), is almost zero in a range of 0 to about 0.3 mm, increases from about 0.3 mm, and then falls zero again at about 1.6 mm. Accordingly, when the centers of the strain gauge resistors 3a–3d are disposed at the positions, distances of which from the center point O are about 1.6 mm, the output voltage becomes large and simultaneously the difference in thermal stress, (σyy−σxx), can be minimized to reduce the detection error. Further, in the model in which the rotation angle Θ is 37° shown in FIG. 32, there exists the position where the difference in thermal stress, (σyy−σxx), is zero (position where a distance from the center point O is a little over than 1.9 mm), so that the difference in thermal stress, (σyy−σxx), can be minimized to reduce the detection error. In the model in which the angle of rotation θ is 40° shown in FIG. 33, the region where the difference in thermal stress, (σyy−σxx), is limited to the very narrow region up to about 0.2 mm from the center point O. Therefore, the above-described effect of reducing the error cannot be expected. In view of all the above, the tolerance of the rotation angle Θ is in a range of 15° to 37° and the rotation angle Θ is changeable within that range.

(Eighth Embodiment)

FIGS. 34–38 show an eighth preferred embodiment of the present invention attained by modifying the seventh embodiment. The present embodiment will be explained below only regarding the difference between it and the seventh embodiment.

Figure 34:
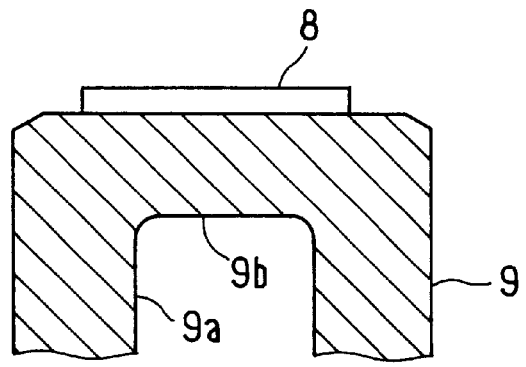
FIG. 34 is a cross-sectional view partially showing a pressure detecting apparatus in an eighth preferred embodiment.
Figure 35:
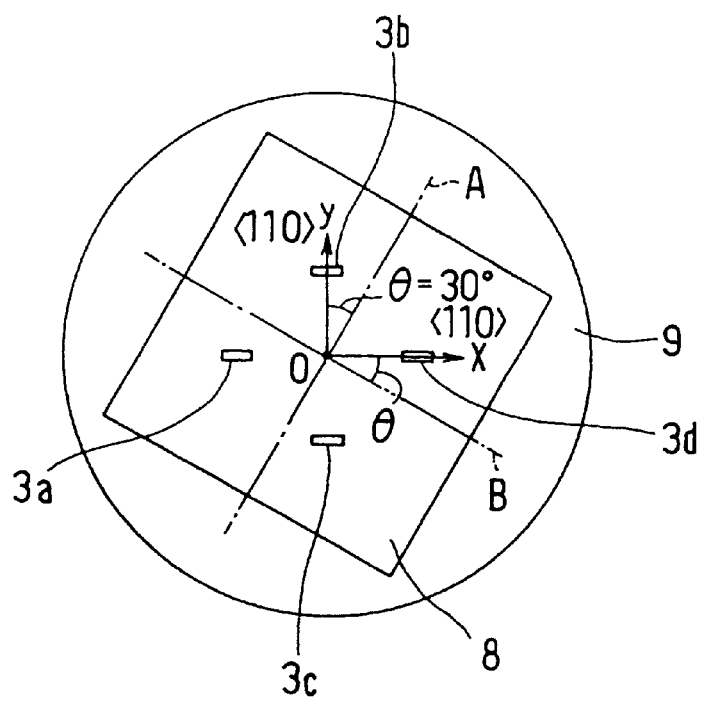
FIG. 35 is a plan view showing a sensor chip in the eighth embodiment.

Referring to FIGS. 34, 35, the entire back surface of the sensor chip 8 constructed in the same manner as that of the seventh embodiment is bonded to the upper surface of a metallic diaphragm 9b formed at an upper portion of a metallic sensing body 9 by utilizing low melting point glass or adhesive (not shown). In the present embodiment, a pressure detecting apparatus is for detecting a pressure of 200 MPa and therefore the sensing body 9 has a structure corresponding to that. That is, the sensing body 9 is formed from for example covar (30% Ni-20% Co—Fe) and a diameter of a pressure receiving port 9a and the thickness of the diaphragm 9b are set at about 2.5 mm and about 2 mm, respectively.

When the thickness of the diaphragm 9b is largely increased as described above, the thermal stress distribution on the surface of the sensor chip 8 also changes more or less.

Then, in order to accommodate to such a change in the thermal stress distribution, the rotation angle Θ of the crystallographical directions (<110> directions) of single-crystal silicon of the sensor chip 8 with respect to the side of the sensor chip 8 is set at about 30°. The rotation angle Θ is fixed due to the following reason.

Figure 36:
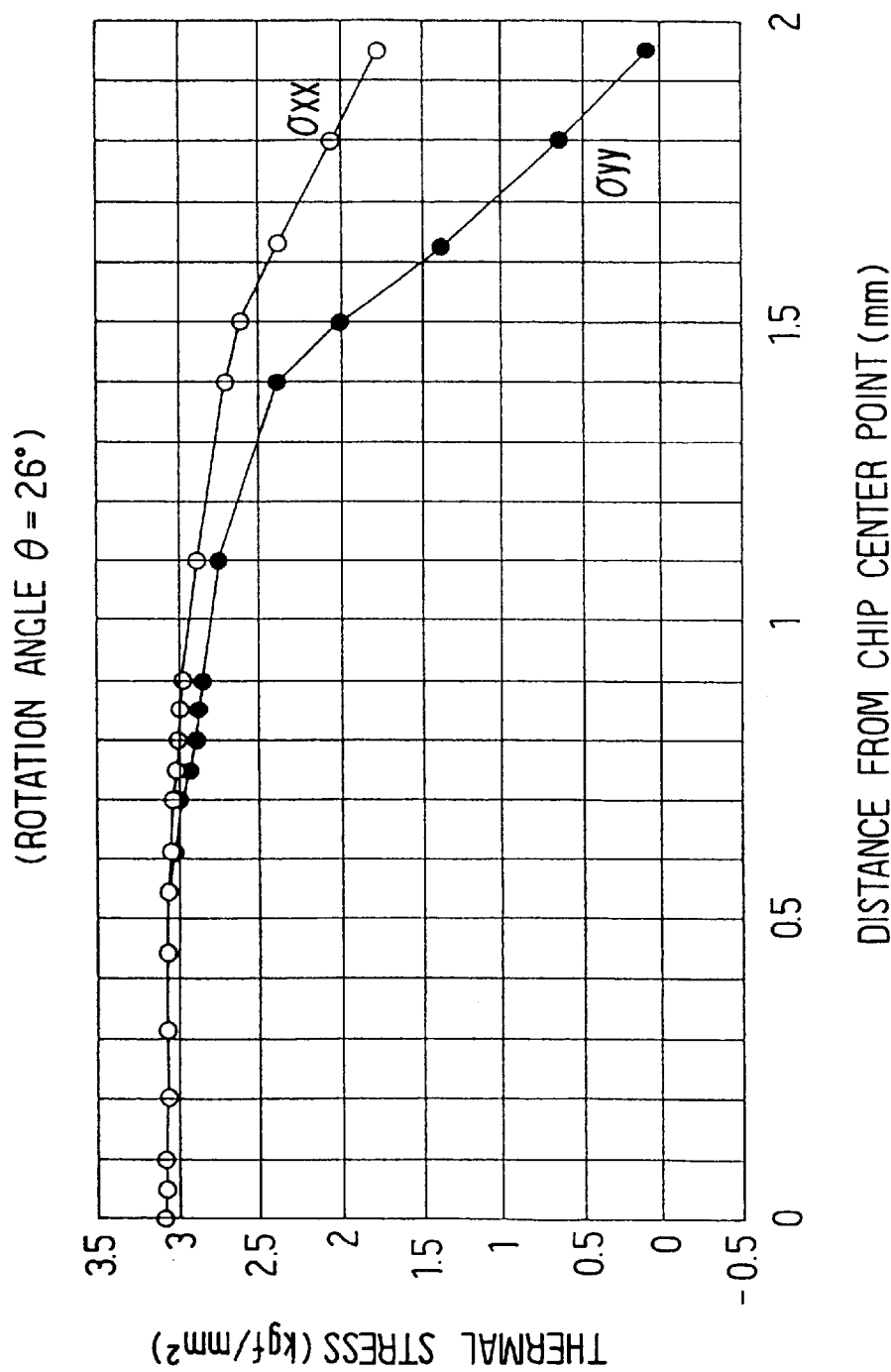
FIGS. 36–38 are graphs showing thermal stress distributions produced on the surface of the sensor chip, depending on rotation angle Θ of 26°, 30°, 34° in the eighth embodiment.

That is, three models of the pressure detecting apparatus including the square sensor chip 8 bonded to the diaphragm 9b having a thickness of about 2 mm were assumed to respectively have the rotation angles Θ of 26°, 30°, and 34°. Then, the thermal stress distribution on the surface of the sensor chip 8 in each model was analyzed by the finite element method in the state where a predetermined temperature difference (e.g. 95° C.) was given to the pressure detecting apparatus and no pressure was applied to the diaphragm. The results of the models are shown in FIGS. 36–38, in which the thermal stresses at a plurality of points along the x axis in FIG. 35 are decomposed into stresses σxx in the x axis direction and stresses σyy in the y axis direction at respective points.

Figure 37:
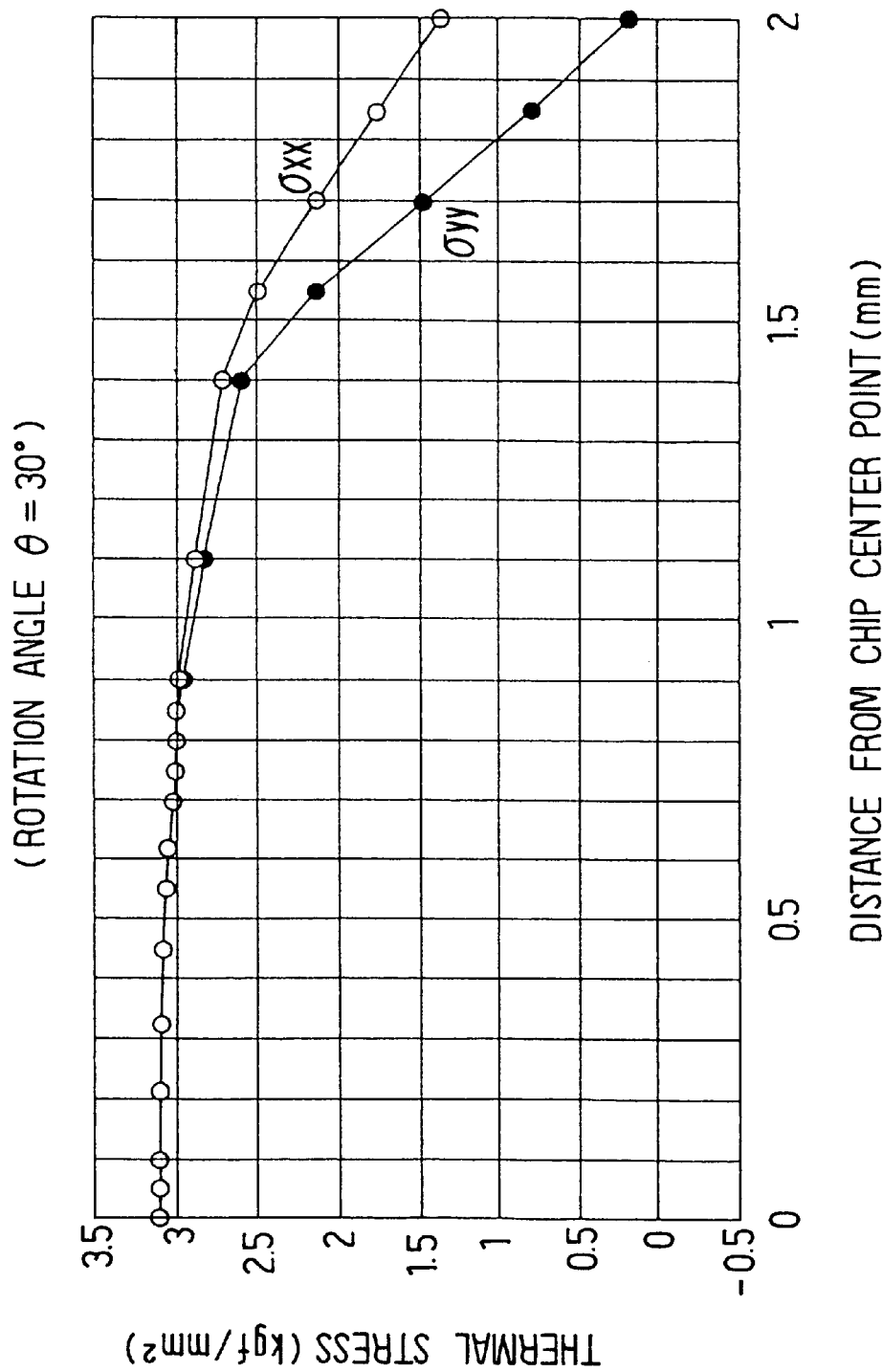
Figure 38:
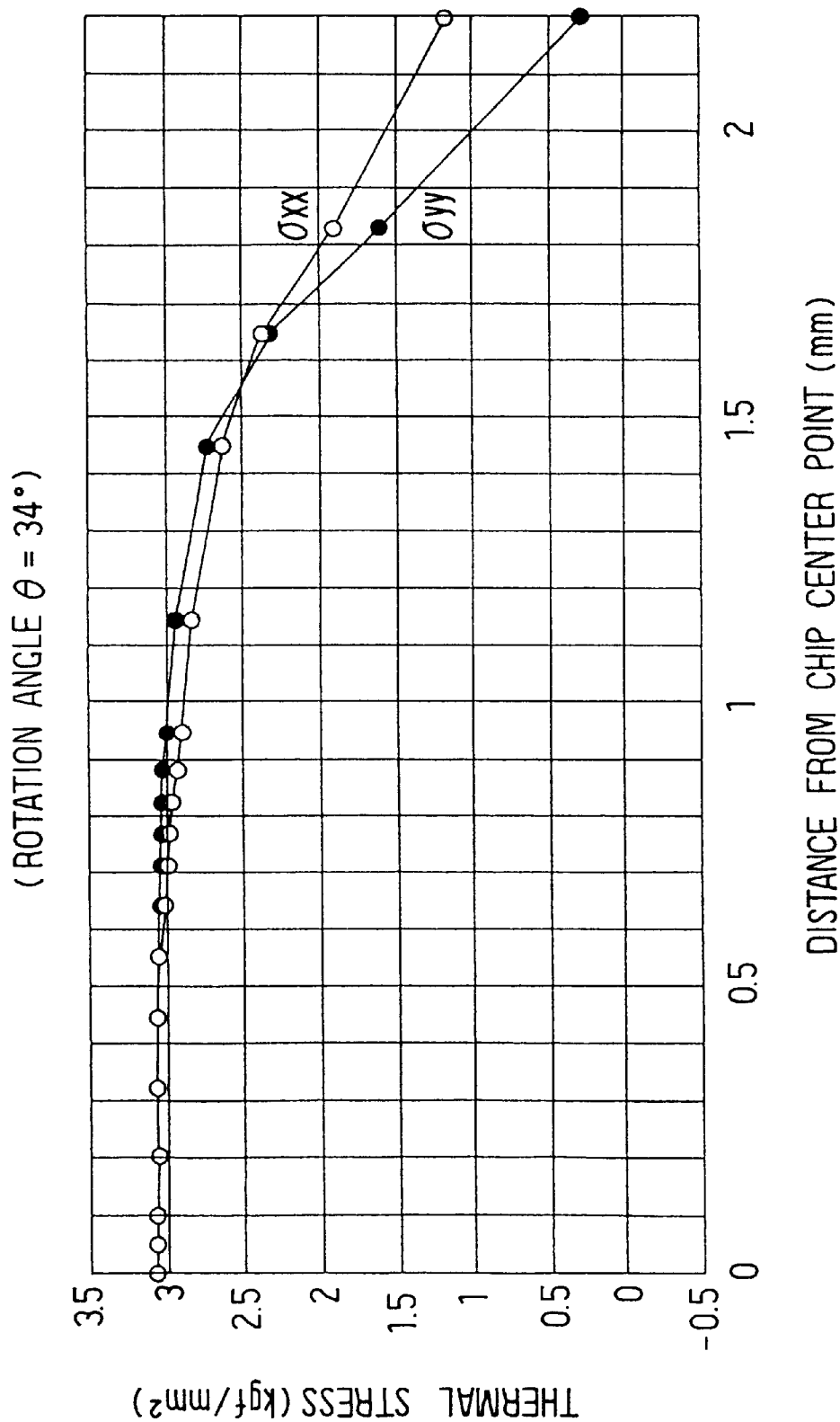

It can be seen from the analytical results that the model having the rotation angle Θ of 30° shown in FIG. 37 provides the most widest region where the difference between the thermal stresses in the x axis and y axis directions is almost zero in the tree models, and the widest region is up to the distance of about 1 mm from the center point O. Accordingly, when the strain gauge resistors 3a–3d are disposed at the positions where the distances from the center point O of the chip are about 1 mm or less, even in the structure of the present embodiment, the difference between the thermal stresses in the x axis and y axis directions may be almost zero to reduce the detection error and simultaneously the output voltage level $V_{out}$ can be sufficiently increased to improve the sensitivity.

The rotation angle Θ is not limited to 30° which is cited in the present embodiment and may be changed to another angle as long as the angle allows to assure the range, by a certain degree, where the difference between the thermal stresses in the x axis and y axis directions at the disposed positions of the strain gauge resistors 3a–3d is almost zero, similarly to the seventh embodiment.

(Ninth Embodiment)

While the square sensor chip 8 is made of single-crystal silicon having (100) plane orientation in the seventh and eighth embodiments described above, the sensor chip may be made of single-crystal silicon having (110) plane orientation.

Figure 39:
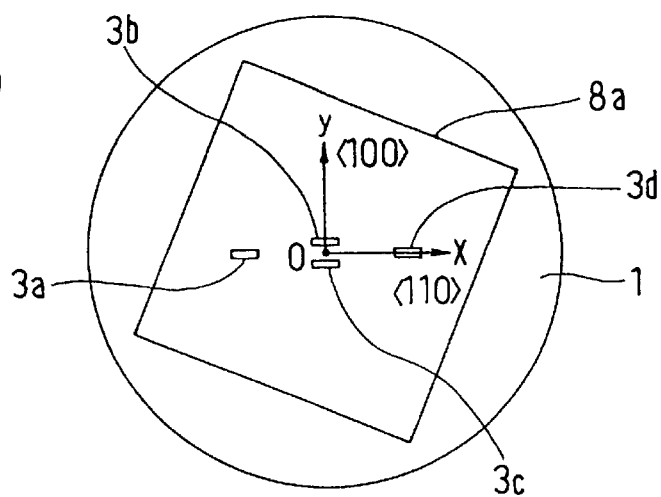
FIG. 39 is a plan view showing a sensor chip in a ninth preferred embodiment.

FIG. 39 shows a ninth preferred embodiment of the present invention adopting such a structure. That is, the ninth embodiment is a modified one of the seventh embodiment. It is then necessary to change arrangement of the strain gauge resistors 3a–3d on a sensor chip 8a from that shown in FIG. 26 to that shown in FIG. 39, because the sensor chip 8a is made of single-crystal silicon having (110) plane orientation as described above. The strain gauge resistors 3a–3d constitute the Wheatstone bridge circuit shown in FIG. 3.

Specifically, the sensor chip 8a has a <100> direction and a <110> direction of the single-crystal silicon, which are perpendicular to one another and are parallel to the surface plane of the sensor chip 8a. In this case, the pair of strain gauge resistors 3b, 3c positioned on the opposite sides of the Wheatstone bridge circuit are disposed at the central portion of the sensor chip 8a along the <100> direction, i.e. on the y axis passing through the center point O of the sensor chip 8a, and the pair of strain gauge resistors 3a, 3d positioned on the other opposite sides of the Wheatstone bridge circuit are disposed at peripheral portions of the sensor chip 8a along the <110> directions, i.e., on the x axis passing through the center point O.

In the present embodiment, the difference between the thermal stress acting on the strain gauge resistors 3b, 3c and the thermal stress acting on the strain gauge resistors 3a, 3d may be almost zero by the same reasons as explained in the sixth embodiment. Accordingly, the output voltage level $V_{out}$ having small thermal stress offset voltage is obtained from the Wheatstone bridge circuit, so that the sensitivity is improved while reducing the detection error.

(Tenth Embodiment)

In the eighth embodiment, when the square sensor chip 8 is disposed on the diaphragm 9b that has a thickness of approximately 2 mm, the preferable rotation angle Θ of the sensor chip 8 is set to be 30°.

Figure 40:
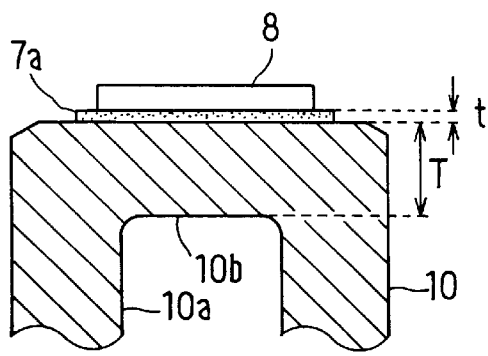
FIG. 40 is a cross-sectional view partially showing a pressure detecting apparatus in a tenth preferred embodiment.
Figure 41:
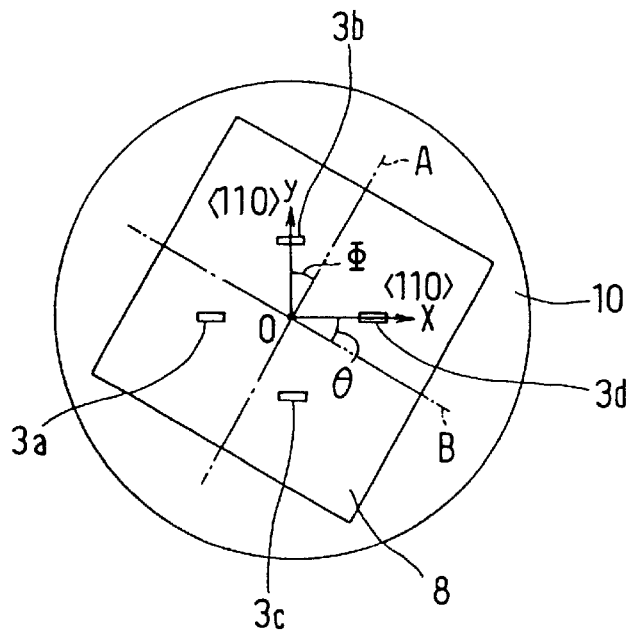
FIG. 41 is plan view showing a sensor chip in the tenth embodiment.

As opposed to this, in a tenth preferred embodiment, as shown in FIGS. 40, 41, in a state where the square sensor chip 8 made of single-crystal silicon having (100) plane orientation is bonded to a metallic diaphragm 10b of a sensing body 10 through a low melting point glass 7a, dependency of optimum rotation angle φ with respect to thickness T of the diaphragm 10 and thickness t of the low melting point glass 7a will be considered. Here, optimum rotation angle φ is rotating angle Θ when a difference between thermal stresses in the x axis and y axis directions is zero. In the tenth embodiment, a diameter of a pressure receiving port 10a is 2.5 mm, and the size and the thickness of the sensor chip 8 are 3.5 mm square and 200 μm, respectively, as in the eighth embodiment. Also, four strain gauge resistors 3a–3d are disposed on the sensor chip 8 point-symmetrically with respect to the center point O on the x, y axes parallel to the respective <110> directions, and have longitudinal axes respectively parallel to the x axis. A distance of the strain gauge resistors from the center point O is set at a predetermined length. The low melting point glass 7a is formed into a circular shape having an area larger than that of the sensor chip 8 as shown in FIG. 40. Incidentally, in FIG. 41, the low melting point glass 7a is omitted.

Figure 42:
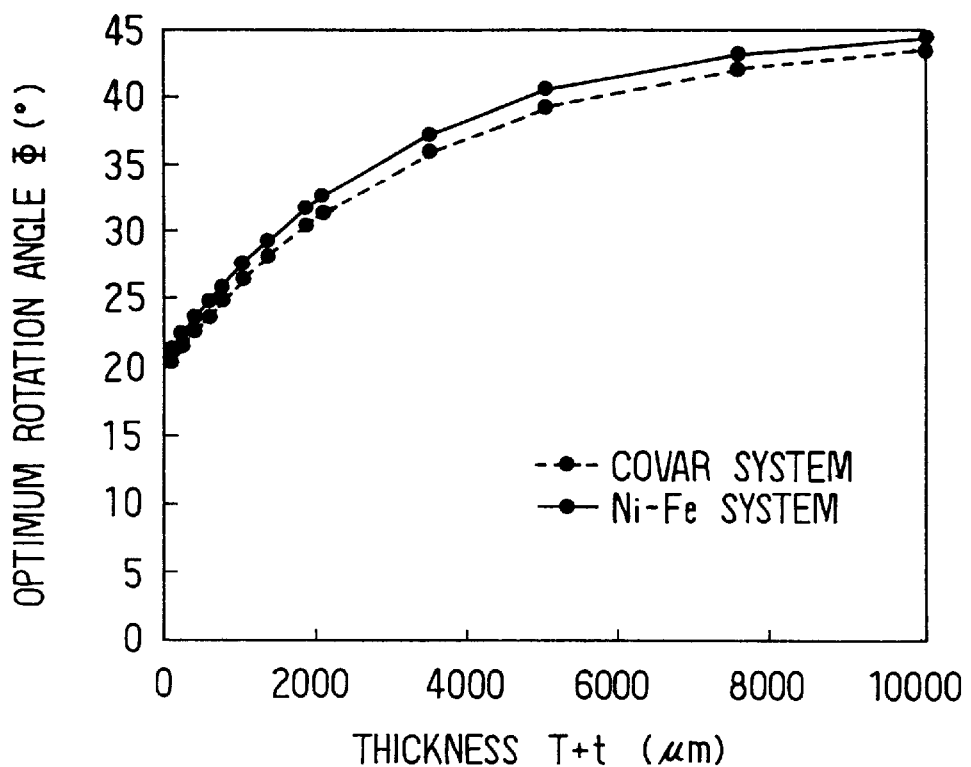
FIG. 42 is a graph showing relationships between optimum rotation angle φ of the sensor chip and thickness (T+t) in which T represents a thickness of a diaphragm and t represents a thickness of a low melting point glass.
Figure 43:
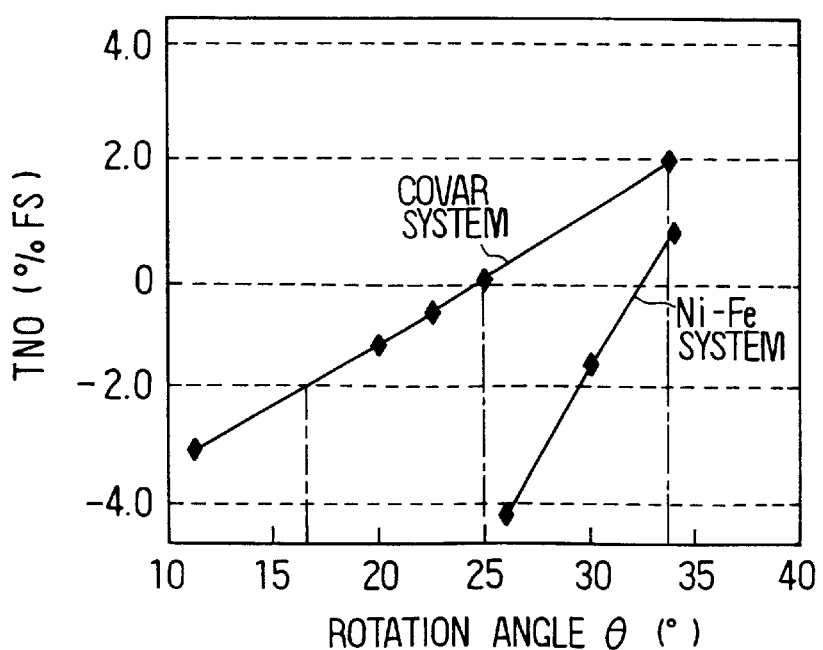
FIG. 43 is a graph showing relationships between temperature nonlinearity of offset voltage (TNO) and rotation angle Θ of the sensor chip.

In the above described structure, as a result of studies and analyses, the present inventors found the following equation (8) concerning optimum rotation angle φ, thickness T of the diaphragm 10b, and thickness t of the low melting point glass 7a;

$$\phi = A - Be^{c(T+t)} (°) \qquad (8)$$

wherein A, B, C are constants having ranges of $40<A<45$, $15<B<30$, $-4\times10^{-4}<C<-2\times10^{-4}$, respectively, which are determined based on material of the metallic diaphragm and allowable accuracy. Thicknesses T, t have ranges of 100 μm<T<3500 μm, 15 μm<t<150 μm, which are determined based on material strength and sensor sensitivity. The curve of the equation (8) is shown in FIG. 42 as two cases that the diaphragm is made of covar system stem, and Ni—Fe system stem. Specifically, the equation (8) was determined from the approximate curve of FIG. 42, which was obtained from analytical results of offset temperature characteristics with respect to the rotation angle Θ and with respect to the sum of thicknesses (T+t) in the above two cases by simulations. FIG. 43 shows the offset temperature characteristic with respect to the rotation angle Θ as an example. In the simulation for FIG. 43, the thickness of the diaphragm made of cover system stem was set at 0.65 mm and the thickness of the diaphragm made of Ni—Fe system stem was set at 2.0 mm. When the equation (8) was determined, central values of constants A, B were respectively fixed at 45°, 25°, by assuming cases that T+t→0 and T+t→∞. Constant C was fixed to securely approximate each point. The ranges of constants A, B were determined based on temperature non-linearity of offset voltage (TNO). Specifically, the allowable TNO was set within ±2.0%F.S. in view of design. Accordingly, allowable variation of the rotation angle becomes ±8.4° at each point, and the ranges of constants A, B were derived.

Thus, the present inventors found the relationship between optimum rotation angle φ and thicknesses T, t of the diaphragm and the low melting point glass. Accordingly, the pressure detecting apparatus can be readily manufactured to comply with design requirements and to reduce thermal stress at low cost.

(Other Embodiments)

The present invention is not limited to the embodiments described above and may be changed or expanded within the scope of the present invention as defined in the appended claims.

For example, although the four strain gauge resistors are formed on the sensor chip to construct the Wheatstone bridge circuit, a half bridge circuit may be formed by two strain gauge resistors. Further, the material of the sensor chip is not limited only to the single-crystal silicon and other single-crystal semiconductor materials may be utilized as long as it brings about the piezo resistance effect.

Further, although the above described embodiments are explained by exemplifying the case where the length between opposite sides or the diameter of the sensor chip is larger than the diameter of the diaphragm, the dimensional relationship may be opposite from that. The material of the sensing body is not limited to covar. Still more, although the strain gauge resistors are made of diffusion resistors, they may be formed from poly-crystal silicon resistors.

What is claimed is:

1. A pressure detecting apparatus comprising:
a diaphragm made of metal for receiving pressure;
a sensor chip that is made of a single-crystal semiconductor, the sensor chip being separate from, and disposed on, the diaphragm, the sensor chip having a first surface joined to the diaphragm and a second surface opposite the first surface, the second surface having a generally rectangular shape with first and second sides perpendicular to one another;
a strain gauge resistor disposed on the second surface of the sensor chip and having a sensitivity direction that is non-parallel to both the first and second sides; and
the sensitivity direction of the strain gauge resistor forms a specific angle in a range of 15° to 37° with one of the first and second sides to minimize a temperature non-linearity of offset voltage.

2. The pressure detecting apparatus of claim 1, wherein the specific angle is in a range of 15° to 33°.

3. The pressure detecting apparatus of claim 1, wherein:
the sensor chip is made of the single-crystal semiconductor having an approximately (100) plane orientation; and
the sensitivity direction of the strain gauge resistor is parallel to a <110> direction of the single-crystal semiconductor.

4. The pressure detecting apparatus of claim 3, wherein:
the strain gauge resistor is composed of a plurality of strain gauge resistors that are disposed on the sensor chip point-symmetrically with respect to a center point of the sensor chip; and
each of the plurality of strain gauge resistors extends in parallel with the <110> direction.

5. The pressure detecting apparatus of claim 1, wherein:
the sensor chip is made of the single-crystal semiconductor having an approximately (110) plane orientation; and
the sensitivity direction of the strain gauge resistor is parallel to a <110> direction of the single-crystal semiconductor.

6. The pressure detecting apparatus of claim 5, wherein:
the strain gauge resistor is composed of first and second strain gauge resistors, each of which extends in parallel with the <110> direction; and
distances of the first and second strain gauge resistors from a center point of the sensor chip are different from each other.

7. The pressure detecting apparatus of claim 1, wherein the diaphragm has a circular shape.

8. The pressure detecting apparatus of claim 7, wherein the pressure applied to the diaphragm is more than 10 MPa.

9. The pressure detecting apparatus of claim 1, further comprising a cylindrical sensing body made of the metal and integrally having the diaphragm as a bottom part thereof.

10. The pressure detecting apparatus of claim 1, wherein the sensitivity direction of the strain gauge resistor forms the specific angle in the range of 15° to 37° as determined by computer modeling with one of the first and second sides to minimize the temperature nonlinearity of offset voltage.

11. The pressure detecting apparatus of claim 1, wherein the sensor chip has a constant thickness across an entire area thereof.

12. The pressure detecting apparatus of claim 1, wherein:
an area of the first surface of the sensor chip is equal to that of the second surface of the sensor chip; and
the first surface of the sensor chip is jointed to the diaphragm at an entire area thereof.

13. The pressure detecting apparatus of claim 1, further comprising a cylindrical sensing body made of the metal and having a pressure receiving port, wherein the diaphragm is formed as a bottom of the cylindrical sensing body.

14. The pressure detecting apparatus of claim 1, wherein the strain gauge resistor is composed of a plurality of strain gauge resistors, all of which extend in parallel with one another.

15. The pressure detecting apparatus of claim 1, wherein the sensitivity direction of the strain gauge resistor forms a specific angle that is approximately a center value of the range of 15° to 37° with the one of the first and second sides.

16. A pressure detecting apparatus comprising:
a diaphragm made of metal for receiving a pressure;
a sensor chip made of a single-crystal semiconductor, the sensor chip being separate from, and joined to, the diaphragm, the sensor chip having first and second sides perpendicular to one another; and
a strain gauge resistor provided on the sensor chip on a sensor chip surface opposite that which is joined to the diaphragm, the strain gauge resistor extending in a specific direction that is non-parallel to both the first side and the second side of the sensor chip to minimize a temperature nonlinearity of offset voltage.

17. The pressure detecting apparatus of claim 16, wherein the specific direction forms an angle in a range of 15° to 37° with one of the first and second sides.

18. The pressure detecting apparatus of claim 17, wherein the angle is in a range of 15° to 33°.

19. The pressure detecting apparatus of claim 16, wherein:
the sensor chip is made of the single-crystal semiconductor having an approximately (100) plane orientation; and the specific direction is parallel to a <110> direction of the single-crystal semiconductor.

20. The pressure detecting apparatus of claim 19, wherein:
the strain gauge resistor is composed of a plurality of strain gauge resistors that are disposed on the sensor chip point-symmetrically with respect to a center point of the sensor chip; and
each of the plurality of strain gauge resistors extends in parallel with the <110> direction.

21. The pressure detecting apparatus of claim 16, wherein:
the sensor chip is made of the single-crystal semiconductor having an approximately (110) plane orientation; and
the specific direction is parallel to a <110> direction of the single-crystal semiconductor.

22. The pressure detecting apparatus of claim 21, wherein:
the strain gauge resistor is composed of first and second strain gauge resistors, each of which extends in parallel with the <110> direction; and
distances of the first and second strain gauge resistors from a center point of the sensor chip are different from each other.

23. The pressure detecting apparatus of claim 16, wherein the diaphragm has a circular shape.

24. The pressure detecting apparatus of claim 23, wherein the pressure applied to the diaphragm is more than 10 MPa.

25. The pressure detecting apparatus of claim 16, further comprising a cylindrical sensing body made of the metal and integrally having the diaphragm as a bottom part thereof.

26. The pressure detecting apparatus of claim 14, wherein a number of the plurality of strain gauge resistors is at least four.

27. The pressure detecting apparatus of claim 16, further comprising a cylindrical sensing body made of the metal and having a pressure receiving port, wherein the diaphragm is formed as a bottom of the cylindrical sensing body.

28. The pressure detecting apparatus of claim 16, wherein the strain gauge resistor is composed of four strain gauge resistors, each of which extends in a non-parallel manner relative to the first and second sides of the sensor chip.

29. The pressure detecting apparatus of claim 28, wherein the four strain gauge resistors extend in parallel with one another.

30. The pressure detecting apparatus of claim 16, wherein the strain gauge resistor extends in the specific direction as determined by computer modeling that is non-parallel to both the first side and the second side of the sensor chip to minimize the temperature nonlinearity of offset voltage.

31. A pressure detecting apparatus comprising:
a diaphragm made of metal for receiving pressure;
a sensor chip made of a single-crystal semiconductor, the sensor chip being separate from, and disposed on, the diaphragm, the sensor chip having a first surface joined to the diaphragm and a second surface opposite the first surface, the second surface having a generally rectangular shape with first and second sides perpendicular to one another; and
a plurality of strain gauge resistors disposed on the second surface of the sensor chip, all of the plurality of strain gauge resistors having sensitivity directions, each of which is non-parallel to both the first and second sides, to minimize a temperature nonlinearity of offset voltage.

32. The pressure detecting apparatus of claim 31, wherein a number of the plurality of strain gauge resistors is four at least.

33. The pressure detecting apparatus of claim 31, wherein each of the sensitivity directions of the plurality of strain gauge resistors forms a specific angle in a range of 15° to 37° with one of the first and second sides.

34. The pressure apparatus of claim 31, wherein the plurality of strain gauge resistors extend in parallel with each other.

35. The pressure detecting apparatus of claim 33, wherein each of the sensitivity directions of the plurality of strain gauge resistors forms a specific angle that is approximately a center value of the range of 15° to 37° with the one of the first and second sides.

36. The pressure detecting apparatus of claim 31, wherein the plurality of strain gauge resistors have sensitivity directions, each of which is non-parallel to both the first and second sides as determined by computer modeling, to minimize the temperature nonlinearity of offset voltage.

37. A pressure detecting apparatus comprising:
a diaphragm made of metal for receiving pressure;
a sensor chip that is made of a single-crystal semiconductor having an approximately (100) plane orientation, the sensor chip being separate from, and disposed on, the diaphragm, the sensor chip having a first surface joined to the diaphragm and a second surface opposite the first surface, the second surface having a generally rectangular shape with first and second sides perpendicular to one another;
a strain gauge resistor disposed on the second surface of the sensor chip and having a sensitivity direction that is non-parallel to both the first and second sides; and
the sensitivity direction of the strain gauge resistor forms a specific angle in a range of 15° to 37° with one of the first and second sides to minimize a temperature nonlinearity of offset voltage.

38. A pressure detecting apparatus comprising:
a diaphragm made of metal for receiving pressure;
a sensor chip that is made of a single-crystal semiconductor having an approximately (110) plane orientation, the sensor chip being separate from, and disposed on, the diaphragm, the sensor chip having a first surface joined to the diaphragm and a second surface opposite the first surface, the second surface having a generally rectangular shape with first and second sides perpendicular to one another;
a strain gauge resistor disposed on the second surface of the sensor chip and having a sensitivity direction that is non-parallel to both the first and second sides; and
the sensitivity direction of the strain gauge resistor forms a specific angle in a range of 15° to 37° with one of the first and second sides to minimize a temperature nonlinearity of offset voltage.

39. A pressure detecting apparatus comprising:
a diaphragm made of metal for receiving pressure;
a sensor chip made of a single-crystal semiconductor having an approximately (100) plane orientation, the sensor chip being separate from, and disposed on, the diaphragm, the sensor chip having a first surface joined to the diaphragm and a second surface opposite the first surface, the second surface having a generally rectangular shape with first and second sides perpendicular to one another; and
a plurality of strain gauge resistors disposed on the second surface of the sensor chip, all of the plurality of strain gauge resistors having sensitivity directions, each of which is non-parallel to both the first and second sides to minimize a temperature nonlinearity of offset voltage.

40. A pressure detecting apparatus comprising:

a diaphragm made of metal for receiving pressure;

a sensor chip made of a single-crystal semiconductor having an approximately (110) plane orientation, the sensor chip being separate from, and disposed on, the diaphragm, the sensor chip having a first surface joined to the diaphragm and a second surface opposite the first surface, the second surface having a generally rectangular shape with first and second sides perpendicular to one another; and a plurality of strain gauge resistors disposed on the second surface of the sensor chip, all of the plurality of strain gauge resistors having sensitivity directions, each of which is non-parallel to both the first and second sides to minimize a temperature nonlinearity of offset voltage.

* * * * *